United States Patent
Terentiev

(10) Patent No.: US 6,837,613 B2
(45) Date of Patent: Jan. 4, 2005

(54) STERILE FLUID PUMPING OR MIXING SYSTEM AND RELATED METHOD

(75) Inventor: Alexandre N. Terentiev, Lexington, KY (US)

(73) Assignee: Levtech, Inc., Lexington, KY (US)

(*) Notice: Subject to any disclaimer, the term of this patent is extended or adjusted under 35 U.S.C. 154(b) by 124 days.

(21) Appl. No.: 10/120,006

(22) Filed: Apr. 10, 2002

(65) Prior Publication Data

US 2002/0145940 A1 Oct. 10, 2002

Related U.S. Application Data

(60) Provisional application No. 60/282,931, filed on Apr. 10, 2001.

(51) Int. Cl.[7] .......................... B01F 13/08; H01L 39/00; B04F 17/00
(52) U.S. Cl. ........................ 366/273; 366/274; 417/420; 505/166
(58) Field of Search ................................. 366/273, 274; 310/103, 93, 90.5; 416/500; 206/219; 505/166; 417/420

(56) References Cited

U.S. PATENT DOCUMENTS

| | | | |
|---|---|---|---|
| 3,399,040 A | * | 8/1968 | Ilg .............................. 604/903 |
| 3,647,397 A | * | 3/1972 | Coleman ..................... 366/273 |
| 3,650,581 A | | 3/1972 | Boden et al. |
| 4,090,745 A | | 5/1978 | Dohogne et al. |
| 4,162,855 A | * | 7/1979 | Bender ....................... 366/274 |
| 4,209,259 A | | 6/1980 | Rains et al. |
| 4,355,906 A | | 10/1982 | Ono |
| 4,498,785 A | * | 2/1985 | de Bruyne .................. 366/274 |
| 4,711,582 A | | 12/1987 | Kennedy |
| 4,770,007 A | | 9/1988 | Murai et al. |
| 5,141,327 A | * | 8/1992 | Shiobara ..................... 366/274 |
| 5,183,336 A | | 2/1993 | Poltorak et al. |
| 5,193,977 A | | 3/1993 | Dame |
| 5,240,322 A | | 8/1993 | Haber et al. |
| 5,350,080 A | | 9/1994 | Brown et al. |
| 5,407,272 A | * | 4/1995 | Meier ......................... 366/274 |
| 5,478,149 A | | 12/1995 | Quigg |
| 5,524,441 A | | 6/1996 | Herrmann et al. |
| 5,533,804 A | * | 7/1996 | Larsson et al. ............. 366/274 |
| 5,567,672 A | | 10/1996 | Terentiev et al. |
| 5,578,012 A | | 11/1996 | Kamen et al. |
| 5,747,426 A | | 5/1998 | Abboud |
| 5,961,213 A | * | 10/1999 | Tsuyuki et al. ............. 366/273 |
| 5,985,535 A | * | 11/1999 | Urabe ......................... 366/273 |
| 5,988,422 A | | 11/1999 | Vallot |
| 5,998,019 A | | 12/1999 | Rosenbaum et al. |
| 6,076,457 A | | 6/2000 | Vallot |
| 6,168,862 B1 | | 1/2001 | Rosenbaum et al. |
| 6,183,460 B1 | | 2/2001 | Smith et al. |
| 6,186,932 B1 | | 2/2001 | Vallot |
| 6,416,215 B1 | * | 7/2002 | Terentiev .................... 366/273 |

FOREIGN PATENT DOCUMENTS

| | | |
|---|---|---|
| DE | 3927045 | 7/1990 |
| DE | 4201693 | 4/1993 |
| DE | 4413463 | 10/1995 |
| DE | 19643844 | 5/1998 |
| FR | 2696949 | 4/1994 |

OTHER PUBLICATIONS

"The FLEXBOY Mixer," www.stedim.com, no date, 4 pgs.

* cited by examiner

Primary Examiner—Tony G. Soohoo
(74) Attorney, Agent, or Firm—King & Schickli, PLLC

(57) ABSTRACT

A system for pumping or mixing a fluid using a levitating, rotating magnetic element and various other components for use in a pumping or mixing system are disclosed. The magnetic element is placed in a vessel or container that can be positioned in close proximity to a superconducting element. The vessel or container may be sealed with the magnetic element and a product therein, with the fluid being introduced after sealing. Preferably, the vessel or container is capable of holding fluid volumes greater than 10 liters.

15 Claims, 19 Drawing Sheets

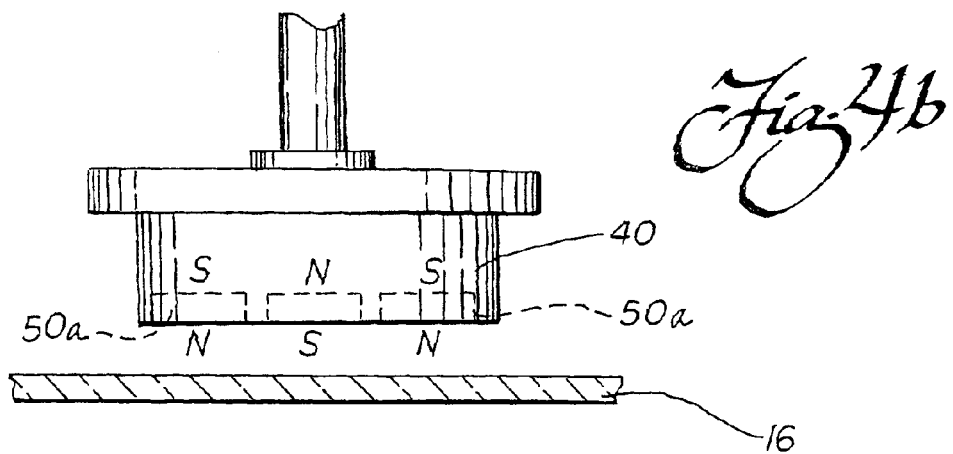
*Fig. 4b*
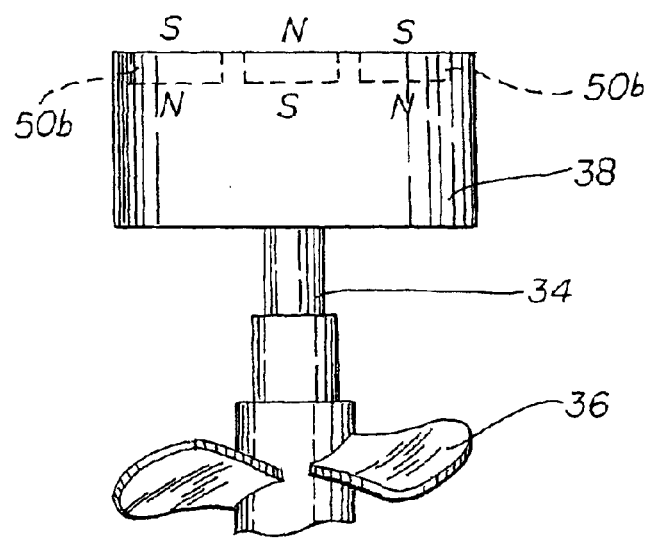
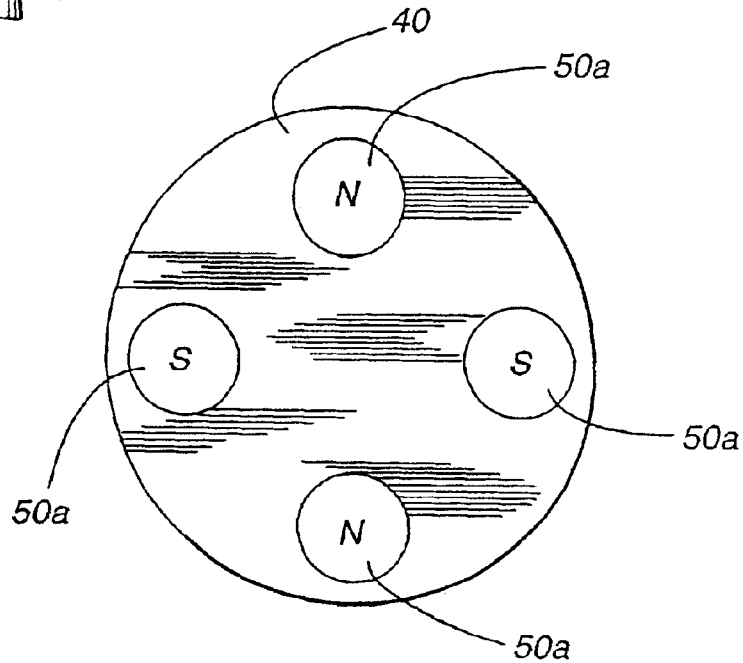
*Fig. 4a*

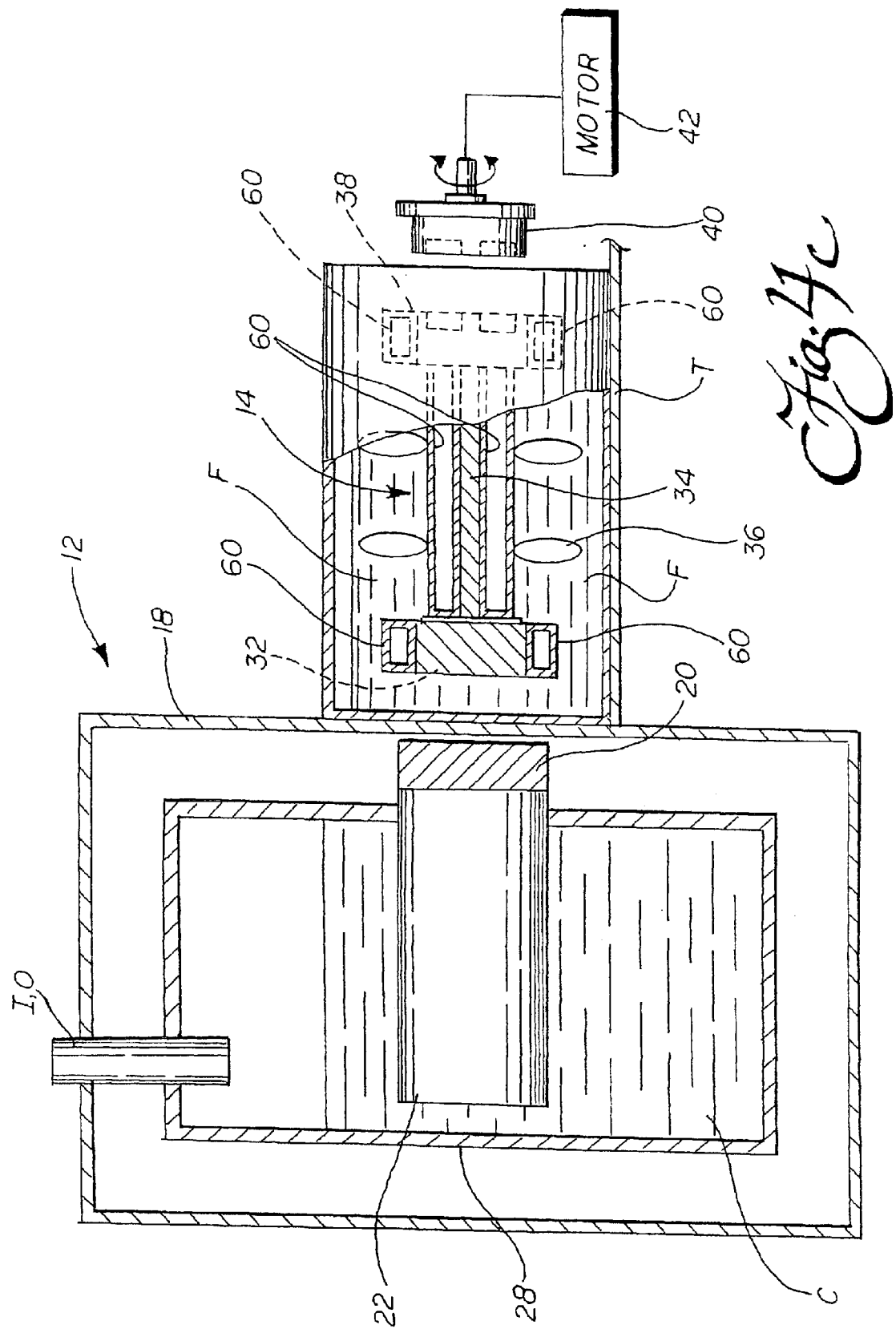

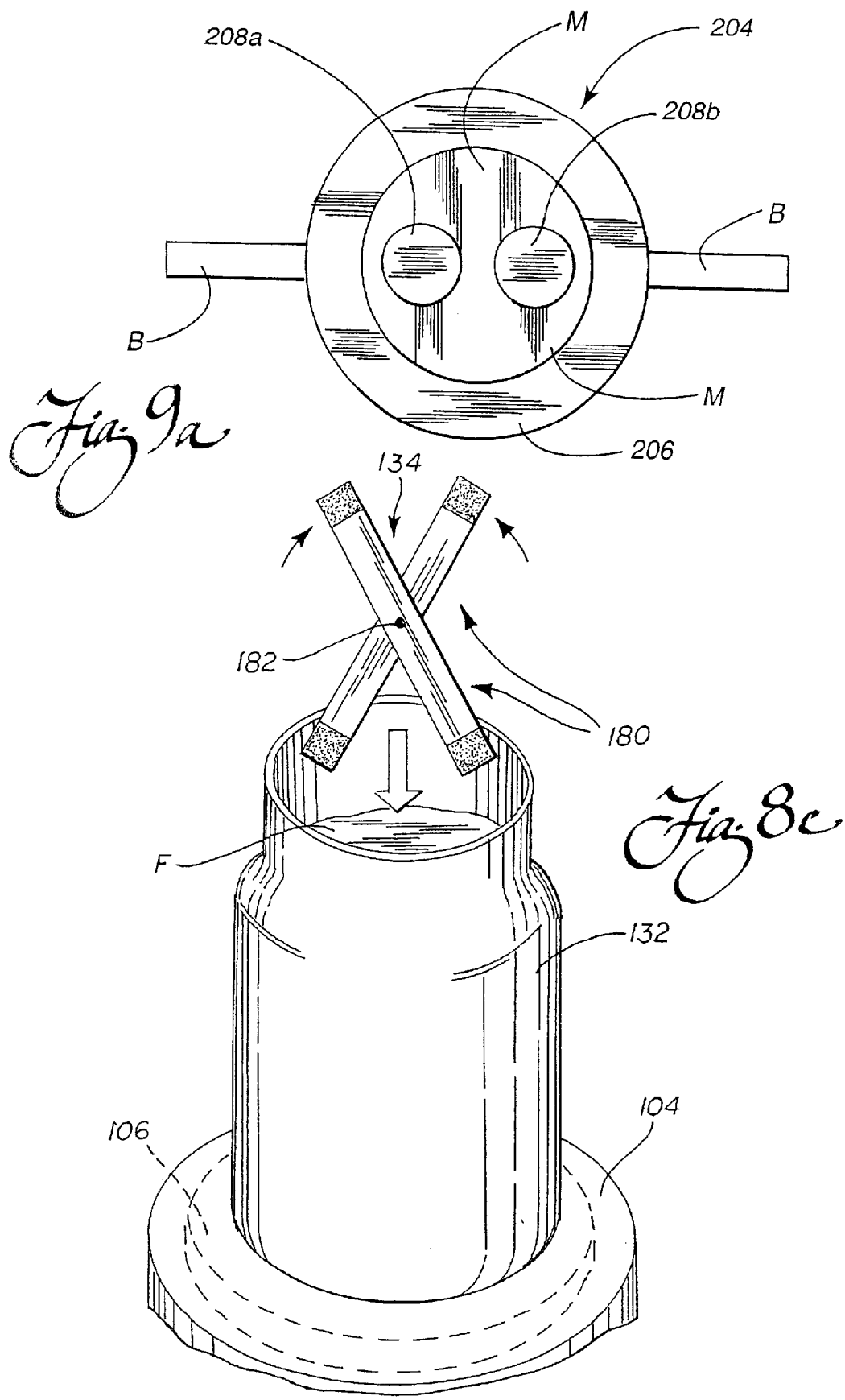

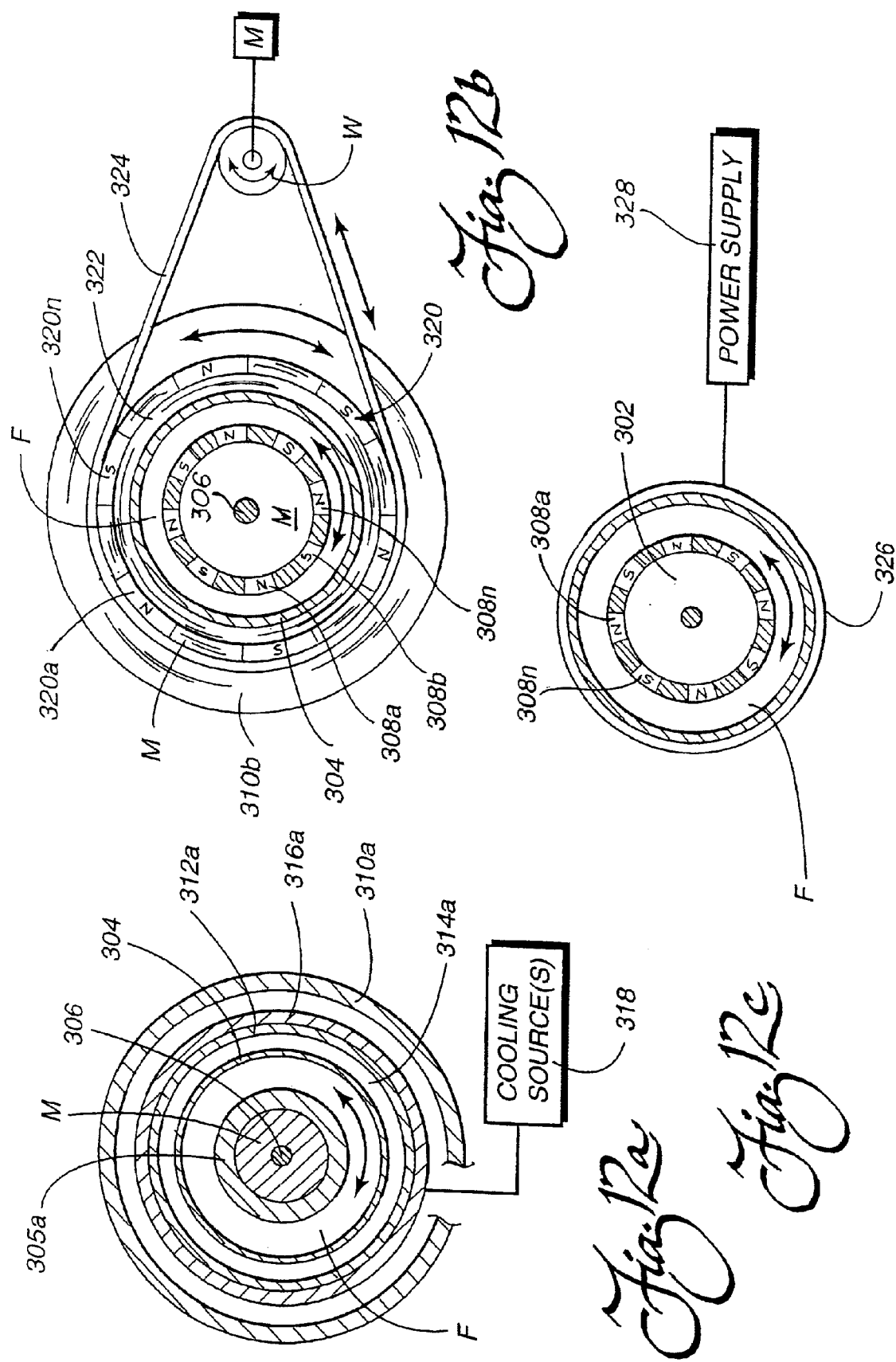

STERILE FLUID PUMPING OR MIXING SYSTEM AND RELATED METHOD

This application claims the benefit of the filing date of U.S. Provisional Application Ser. No. 60/282,931, filed Apr. 10, 2001, the disclosure of which is incorporated herein by reference.

TECHNICAL FIELD

The present invention relates generally to the mixing or pumping of fluids or the like and, more particularly, to a number of systems, related components, and related methods for pumping or mixing fluids using a rotating magnetic element, rotor, impeller, or the like that is levitated by a superconducting element, including a system capable of mixing or pumping a sterile or substantially sterile fluid in or through a pre-sealed vessel or container containing a product, such as a nutrient culture media, buffer, reagent, or the like.

BACKGROUND OF THE INVENTION

Most pharmaceutical solutions and suspensions manufactured on an industrial scale require highly controlled, thorough mixing to achieve a satisfactory yield and to ensure a uniform distribution of ingredients in the final product. Agitator tanks are frequently used to complete the mixing process, but a better degree of mixing is normally achieved by using a mechanical stirrer or impeller (e.g., a set of mixing blades attached to a metal rod). Typically, the mechanical stirrer or impeller is simply lowered into the fluid through an opening in the top of the vessel and rotated by an external motor to create the desired mixing action.

One significant limitation or shortcoming of such an arrangement is the danger of contamination or leakage during mixing. The rod carrying the mixing blades or impeller is typically introduced into the vessel through a dynamic seal or bearing. This opening provides an opportunity for bacteria or other contaminants to enter, which of course can lead to the degradation of the product. A corresponding danger of environmental contamination exists in applications involving hazardous or toxic fluids, or suspensions of pathogenic organisms, since dynamic seals or bearings are prone to leakage. Cleanup and sterilization are also made difficult by the dynamic bearings or seals, since these structures typically include folds and crevices that are difficult to reach. Since these problems are faced by all manufacturers of sterile solutions, pharmaceuticals, or the like, the U.S. Food and Drug Administration (FDA) consequently promulgated strict processing requirements for such fluids, and especially those slated for intravenous use.

Recently, there has also been an extraordinary increase in the use of biosynthetic pathways in the production of pharmaceutical materials, but problems plague those involved in this rapidly advancing industry. The primary problem is that suspensions of genetically altered bacterial cells frequently used to produce protein pharmaceuticals (insulin is a well-known example) require gentle mixing to circulate nutrients. If overly vigorous mixing or contact between the impeller and the vessel wall occurs, the resultant forces and shear stresses may damage or destroy a significant fraction of the cells, as well as protein molecules that are sensitive to shear stresses. This not only reduces the beneficial yield of the process, but also creates deleterious debris in the fluid suspension that requires further processing to remove.

In an effort to overcome this problem, others have proposed alternative mixing technologies. The most common proposal for stirring fluids under sterile conditions is to use a rotating, permanent magnet bar covered by an inert layer of TEFLON (polytetrafluoroethylene), glass, or the like. The magnetic bar is positioned in the bottom portion of the agitator vessel and rotated by a driving magnet positioned external to the vessel. Of course, the use of such an externally driven magnetic bar avoids the need for a dynamic bearing, seal or other opening in the vessel to transfer the rotational force from the driving magnet to the stirring magnet. Therefore, a completely enclosed system is provided. This of course prevents leakage and the potential for contamination created by hazardous materials (e.g., cytotoxic agents, solvents with low flash points, blood products, etc.) and eases clean up.

However, several well-recognized drawbacks are associated with this mixing technology, making it unacceptable for use in many applications. For example, the driving magnet produces not only torque on the stirring magnetic bar, but also an attractive axial thrust force tending to drive the bar into contact with the bottom wall of the vessel. This of course generates substantial friction at the interface between the bar and the bottom wall of the vessel. This uncontrolled friction generates unwanted heat and may also introduce an undesirable shear stress in the fluid. Consequently, fragile biological molecules, such as proteins and living cells that are highly sensitive to temperature and shear stress, are easily damaged during the mixing process, and the resultant debris may contaminate the product. Moreover, the magnetic bar stirrer cannot generate the level of circulation required to provide effective mixing throughout the entire volume of large vessels, such as bags or agitation tanks having volumes of greater than 10 liters, as are commonly used in commercial production operations.

In yet another effort to eliminate the need for dynamic bearings or shaft seals, some have proposed mixing systems using external magnets that remotely couple the mixing impeller to a motor external to the vessel. A typical magnetic coupler comprises a drive magnet attached to the motor and a stirring magnet carrying an impeller. Similar to the magnetic bar technology described above, the driver and stirrer magnets are kept in close proximity to ensure that the coupling between the two is strong enough to provide sufficient torque. An example of one such proposal is found in U.S. Pat. No. 5,470,152 to Rains.

As described above, the high torque generated can drive the impeller into the walls of the vessel creating significant friction. By strategically positioning roller bearings inside the vessel, the effects of friction between the impeller and the vessel wall can be substantially reduced. Of course, high stresses at the interfaces between the ball bearings and the vessel wall or impeller result in a grinding of the mixing proteins and living cells, and a concomitant loss of yield. Further, the bearings may be sensitive to corrosive reactions with water-based solutions and other media and will eventually deteriorate, resulting in frictional losses that slow the impeller, reduce the mixing action, and eventually also lead to undesirable contamination of the product. Bearings also add to the cleanup problems.

In an effort to address and overcome the limitations described above, still others have proposed levitated rotors designed to reduce the deleterious effects of friction resulting from magnetically coupled mixers. By using a specially configured magnetic coupler to maintain only a repulsive levitation force in the vertical direction, the large thrust force between the stirring and driving magnets can be eliminated, along with the resultant shear stress and frictional heating. An example of one such arrangement is shown in U.S. Pat. No. 5,478,149 to Quigg.

However, one limitation remaining from this approach is that only magnet-magnet interactions provide the levitation. This leads to intrinsically unstable systems that produce the desired levitation in the vertical direction, but are unable to control side-to-side movement. As a result, external contact bearings in the form of bearing rings are necessary to laterally stabilize the impeller. Although this "partial" levitation reduces the friction between the impeller and the vessel walls, it does not totally eliminate the drawbacks of the magnetically coupled, roller bearing mixers previously mentioned.

In an effort to eliminate the need for contact or other types of mechanical roller bearings, complex feedback control has been proposed to stabilize the impeller. Typical arrangements use electromagnets positioned alongside the levitating magnet. However, the high power level required to attain only sub-millimeter separations between the levitating magnet and the stabilizing magnets constitutes a major disadvantage of this approach. Furthermore, this solution is quite complex, since the stabilizing magnets must be actively monitored and precisely controlled by complex computer-implemented software routines to achieve even a moderate degree of stability. As a consequence of this complexity and the associated maintenance expense, this ostensible solution has not been accepted in the commercial arena, and it is doubtful that it can be successfully scaled up for use in mixing industrial or commercial scale process volumes.

Thus, a need is identified for an improved system having a levitating magnetic element, impeller, rotor, or like element for mixing or pumping fluids, and especially ultra-pure, hazardous, or delicate fluid solutions or suspensions, including those comprised of cell nutrient media, buffers, reagents, or the like. The system would preferably employ a magnetic element that levitates in a stable fashion to avoid contact with the bottom or side walls of the vessel. Since the element levitates in the fluid, no mixing rod or other structure penetrating through the mixing vessel would be necessary, thus eliminating the need for dynamic bearings or shaft seals and all potentially deleterious effects associated therewith. Since penetration is unnecessary, the vessel could be completely sealed with the magnetic element in place during manufacture or otherwise prior to pumping or mixing, possibly along with a nutrient media or other material, to avoid the potential for contamination and reduce the chance for exposure in the case of hazardous or biological fluids, such as contaminated blood or the like. The vessel and magnetic element could also be made of inexpensive or easily disposable materials and hence discarded after each use, which would eliminate the need for cleaning or sterilization. The absence of a mixing or stirring rod penetrating through the vessel would also allow a slowly rotating rotor or impeller to be held at an off-axis position in a sealed vessel, thus making it possible to independently rotate the vessel about its central axis to achieve very gentle, yet thorough, mixing.

In the case of warm or temperature-sensitive fluids, the use of superconductivity to provide the desired levitation would be possible by thermally isolating and separating the superconducting element from the magnetic element and providing a separate, substantially isolated cooling source. This combined thermal isolation and separation would avoid creating any significant cooling in the vessel, the magnetic element or the fluid being mixed or pumped. The use of a superconductor would also eliminate the sole reliance on magnet-magnet repulsion to provide the levitation force and the concomitant need for active electronic control systems to ensure stable levitation, even with large process volumes and at high rotational speeds. Overall, the proposed system would have superior characteristics over existing mixing or pumping technologies, especially in terms of sterility, mixing quality, safety and reliability, and would be readily adaptable for use in larger, industrial scale operations.

SUMMARY OF THE INVENTION

In accordance with a first aspect of the invention, a fluid pumping or mixing system is disclosed. The system comprises a vessel or container for holding a fluid and a product, a magnetic element capable of providing a pumping or mixing action to the fluid upon rotation, at least one superconducting element for levitating said magnetic element in the vessel or container, a wall defining a chamber around the superconducting element, said chamber thermally isolating the superconducting element from the vessel or container, a cooling source thermally linked to said superconducting element; and a motive device for rotating said magnetic element or said superconducting element.

The chamber is preferably evacuated or insulated to minimize thermal transfer from the superconducting element to the wall and provide the desired thermal isolation. The wall may be the outer wall of a cryostat and the cooling source may be a chamber in said cryostat holding a liquid cryogen. Alternatively, the cooling source may be a refrigerator. The superconducting element may be supported by the wall defining the chamber, with the chamber in turn being supported from a stable mounting structure by a bearing permitting rotational motion. Accordingly, the motive device may rotate the wall and the superconducting element together. Moreover, the cooling source may be coupled to and rotate with the wall.

The product may be selected from the group consisting of a bacterial nutrient culture media, eukaryotic cell nutrient culture media, buffer, reagent, and the like. The product may be introduced into the vessel in a dry, powder-like form and the fluid may be introduced either before or after the magnetic element is in a levitated state. Preferably, the vessel is substantially sealed prior to the levitation of the magnetic element, and may include a sterile fitting for introducing or extracting the fluid, product, or both therefrom. Also, the vessel and magnetic element are sterilized prior to introduction of the fluid. Most preferably, the vessel is capable of holding a volume of fluid of about 10 liters or greater.

In accordance with a second aspect of the invention, a method of mixing a fluid in a vessel or container is disclosed. The method comprises placing a magnetic pumping or mixing element and a product in the vessel or container, substantially sealing the vessel or container from the outside environment, levitating the magnetic element above a superconducting element positioned in an evacuated or insulated chamber adjacent to the vessel or container and thermally linked to a cooling source, and rotating the magnetic element in the vessel or container.

In one specific embodiment, the step of rotating the magnetic element includes rotating the superconducting element. The method may further include cleaning or sterilizing both the vessel or container and the magnetic element prior to the sealing step, as well as placing the product in the vessel prior to the sealing step. In the case where the substantially sealed vessel includes at least one sterile or aseptic fitting, the method may further include the step of introducing the fluid into the vessel after the sealing step through the fitting, whereby a sterile or aseptic mixing environment is created.

In accordance with a third aspect of the invention, an assembly for use in a pumping or mixing system is disclosed. The assembly comprises a sealed vessel or container capable of holding a volume of fluid of about 10 liters or greater (such as tanks capable of holding 100 liters or more), a product sealed in the vessel or container, and a magnetic pumping or mixing element sealed in the vessel or container. The sealed vessel includes means for receiving a fluid while substantially maintaining the sterility of the vessel, mixing element, and product contained therein. The product may be selected from the group consisting of a bacterial nutrient culture media, eukaryotic cell nutrient culture media, buffer, reagent, or like intermediate product for forming one or more end products.

BRIEF DESCRIPTION OF THE DRAWINGS

The accompanying drawings incorporated in and forming apart of the specification illustrate several aspects of the present invention and, together with the description, assist in explaining the principles of the invention. In the drawings:

FIG. 4a is a bottom view of the drive magnet used in situations where exceptional rotational stability of the magnetic element of the preferred embodiment is required;

FIG. 4b is a partially cross-sectional, partially cutaway side view of the system showing the drive magnet of FIG. 4a magnetically coupled to a similarly constructed second permanent magnet forming a part of the magnetic element;

FIG. 4c is one possible embodiment of the pumping or mixing system including a magnetic element having a plurality of chambers for holding a substance that is lighter than the surrounding fluid, such as air, that assists in levitating the element;

FIG. 8c illustrates the magnetic element of FIG. 8b in a partially folded state for insertion in the narrow opening of a vessel or container;

FIG. 9a is a top or bottom view of one possible embodiment of a magnetic element for use in the system of FIG. 9;

FIG. 12a is a cross-sectional view taken along line 12a—12a of FIG. 12;

FIG. 12b is a cross-sectional view taken along line 12b—12b of FIG. 12;

FIG. 12c is a cross-sectional view of the embodiment of FIG. 12, but wherein the motive device is in the form of a winding around the vessel for receiving an electrical current that creates an electrical field and causes the magnetic element to rotate;

DETAILED DESCRIPTION OF THE INVENTION

Figure 1:
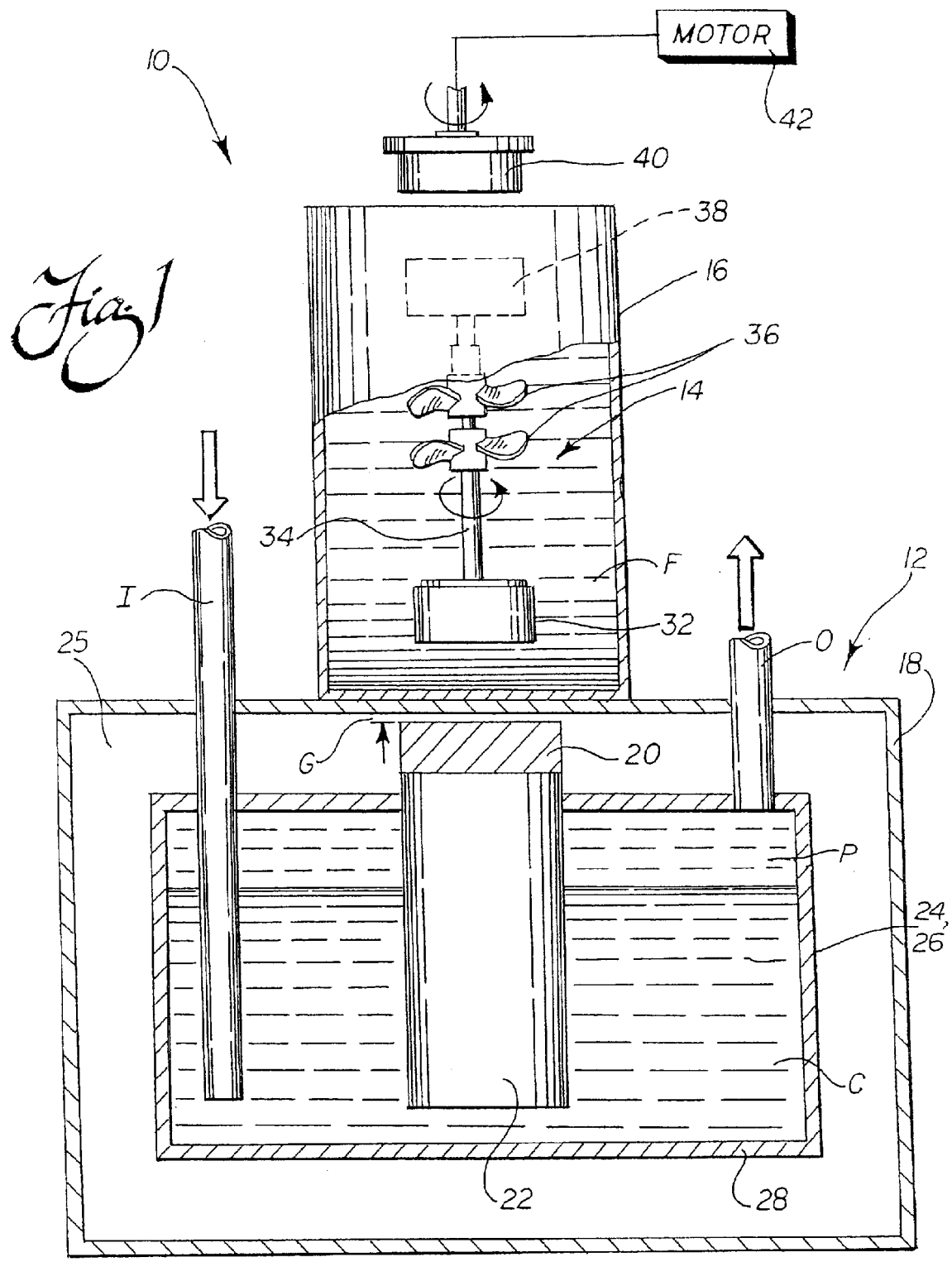
FIG. 1 is a partially cross-sectional, partially cutaway, partially schematic view of one embodiment of the system of the present invention wherein the levitating magnetic element is rotated by an external drive or driving magnet to mix a fluid in a vessel and the cooling source is a separate cooling chamber defined by the outer wall of a cryostat holding a cryogen.

Reference is now made to FIG. 1, which shows a first possible embodiment of the mixing or pumping system 10 of the present invention. In this embodiment, a cryostat 12 is used to hold the cooling source for the superconducting element that produces the desired levitation in a pumping or mixing element 14 (also referred to herein as a "magnetic" element) that is capable upon rotation or other movement of creating a pumping or mixing action in a fluid F. The magnetic pumping or mixing element 14 is placed in a container or vessel 16 positioned external to the cryostat 12, which may already contain the fluid F or may be filled after the magnetic element 14 is in place (along with any other product, including a bacteria or cell nutrient media, reagent, buffer, or like substance). It should be appreciated at the outset that the term "fluid" is used herein to denote any substance that is capable of flowing, as may include fluid suspensions, gases, gaseous suspensions, or the like, without limitation.

In this particular embodiment, the vessel 16 for holding the fluid is shown as being cylindrical in shape and may have an open top. Alternatively, it may be completely sealed from the ambient environment to avoid the potential for fluid contamination or leakage during mixing, or adapted to pump the fluid F from an inlet to an outlet in the vessel 16 (see FIG. 2). In any case, the vessel 16 may be fabricated of any material suitable for containing fluids, including glass, plastic (including specialized single or multi-layered polymers or composites thereof commonly used to ensure that a sterile internal environment is maintained, or those that have special light transmission properties), metal, or the like. Of course, the use of lightweight plastic or other high density polymers is particularly desirable if the vessel 16 is going to be discarded after mixing or pumping is complete, as set forth in more detail in the description that follows.

As illustrated in FIG. 1, the vessel 16 rests atop the outer wall 18 of the cryostat 12. Preferably, this outer wall 18 is fabricated of non-magnetic stainless steel, but the use of other materials is of course possible, as long as the ability of the magnetic element 14 to levitate and rotate remains substantially unaffected. Positioned inside of and juxtaposed to this wall 18 is a superconducting element 20. In the illustrated embodiment, the superconducting element 20 is supported by a rod 22 that serves as the thermal link between the superconducting element 20 and a cooling source 24. The outer wall 18 of the cryostat 12 defines a chamber 25 that is preferably evacuated to thermally isolate the cold superconducting element 20 from the relatively warm vessel 16, magnetic element 14, and fluid F. Positioning of the superconducting element 20 in this vacuum chamber 25 is possible by virtue of the thermal link provided by the rod 22.

The thermal isolation and separation provided by the chamber 25 allows for the superconducting element 20 to be placed in very close proximity to the outer wall 18 without affecting its temperature, or the temperature of the vessel 16. This allows the separation distance from the superconducting element 20 to the inner surface of the wall 18 to be narrowed significantly, such that in the preferred embodiment, the gap G between the two is under 10 millimeters, and can be as narrow as approximately 0.01 millimeters. This substantial reduction in the separation distance enhances the levitational stability, magnetic stiffness, and loading capacity of the magnetic element 14 without the concomitant cooling effects associated with prior art approaches for levitating magnetic elements using cold superconducting elements.

In this first illustrated embodiment, the cooling source 24 is a separate, substantially contained cooling chamber 26 holding a cryogen C, such as liquid nitrogen. The chamber 26 is defined by an outer wall 28 that is substantially thermally separated from the outer wall 18 of the cryostat 12 to minimize heat transfer. An inlet I is provided through this wall 28 for introducing the cryogen into the cooling chamber 26. To permit any vapor P to escape from the chamber 26 as the cryogen C warms, an exhaust outlet O is also provided (see action arrows in FIG. 1 also designating the inlet and outlet). In the illustrated embodiment, the inlet I and outlet O lines may formed of a material having a low thermal conductivity, such as an elongate, thin walled tube formed of non-magnetic stainless steel, and are sealed or welded in place to suspend the cooling chamber 26 in the cryostat 12. As should be appreciated by one of ordinary skill in the art, the use of a thin walled tube formed of a material having a low thermal conductivity, such as stainless steel, results in a negligible amount of thermal transfer from the inlet or outlet to the wall 18. The sealing or welding method employed should allow for the chamber 25 to be maintained in an evacuated state, if desired. Despite this illustration of one possible support arrangement, it should be appreciated that the use of any other support arrangement or means that minimizes thermal transfer between the cooling chamber 26 and the cryostat wall or other housing 18 is also possible.

The rod 22 serving as the thermal link between the cooling source 24 and the superconducting element 20 may be cylindrical and may extend through the outer wall 28 of the cooling chamber 26. The entire surface area of the superconducting element 20 preferably makes contact with the upper surface of the cylindrical rod 22 to ensure that thermal transfer is maximized. The rod 22 may be formed of materials having low thermal resistance/high thermal conductance, such as brass, copper, or aluminum.

As should be appreciated from viewing FIG. 1, and as briefly noted in the foregoing description, the combination of the outer wall 18 and the inner cooling chamber 26 in this first embodiment defines the chamber 25 around the superconducting element 20. Preferably, this chamber 25 is evacuated to minimize heat transfer from the cooling chamber walls 28 and the superconducting element 20 to the outer wall 18 of the cryostat 12. The evacuation pressure is preferably at least $10^{-3}$ torr, and most preferably on the order of $10^{-5}$ torr, but of course may vary depending upon the requirements of a particular application. The important factor is that thermal transfer from the cooling source 24, which in this case is the cooling chamber 26 holding a cryogen C, and the superconducting element 20 to the outer wall 18 is minimized to avoid cooling the vessel 16 or fluid F held therein. Although a vacuum chamber 25 is proposed as one preferred manner of minimizing this thermal transfer, the use of other means to provide the desired thermal isolation is possible, such as by placing insulating materials, substances, or the like in the chamber 25.

As is known in the art, by cooling the superconducting element 20 in the presence of a magnetic field, it becomes capable of distributing the current induced by a permanent magnet such that the magnet levitates a certain distance above the superconducting element, depending primarily upon the intensity and the direction of the magnetic field generated by the levitating magnet. Although basically a repulsive force is created, the peculiar nature of the pinning forces generated actually tie the levitating magnet to the superconducting element as if the two were connected by an invisible spring. As should be appreciated, this form of attachment cannot be achieved in conventional levitation schemes for magnetic elements that employ two opposed permanent magnets that merely repel each other, since no pinning forces act to tie the two magnets together, while at the same time provide a balancing repulsive force.

In the preferred embodiment of the present system 10, the element 20 providing the superconductive effects is a "high temperature" or "type II" superconductor. Most preferably, the superconducting element 20 is formed of a relatively thin cylindrical pellet of melt-textured Yttrium-Barium Copper Oxide (YBCO) that, upon being cooled to a "high" temperature (usually about 77–78 Kelvin) using a cooling source 24, such as the illustrated liquid nitrogen chamber 26, exhibits the desired levitational properties in a permanent magnet. Of course, the use of other known superconducting materials having higher or lower operating temperatures is also possible, and my prior U.S. Pat. No. 5,567,672 is incorporated herein by reference for, among other things, the other high-temperature superconducting materials referenced therein.

The magnetic element 14 in the preferred embodiment includes a first permanent magnet 32 for positioning in the vessel 16 adjacent to the superconducting element 20 such that it levitates in the fluid F. Although the polarity of this first magnet 32 is not critical to creating the desired levitation, the magnet 32 is preferably disk-shaped and polarized in the vertical direction. This ensures that a symmetrical magnetic field is created by the magnet 32 and stable levitation results above the superconducting element 20, while at the same time free rotation relative to the vertical axis is possible.

In a version of the magnetic element 14 particularly adapted for use in relatively deep fluid vessels, a support shaft 34 is connected to and extends vertically from the first permanent magnet 32. Along the shaft 34, at least one, and preferably two, impeller assemblies 36 are carried that serve to provide the desired pumping, or in the case of FIG. 1, mixing action when the magnetic element 14 is rotated. Rotation of the levitating magnetic element 14 in the vessel 16 is achieved by a magnetic coupling formed between a second permanent magnet 38 (shown in dashed line outline in FIG. 1, but see also FIG. 2) and a drive magnet 40 positioned externally of the vessel 16. The drive magnet 40 is rotated by a drive means, such as an electric motor 42 or the like, and the magnetic coupling formed with the second permanent magnet 38 serves to transmit the driving torque to the magnetic element 14 to provide the desired pumping or mixing action. The direction of rotation is indicated by the action arrows shown in FIGS. 1 and 2 as being in the counterclockwise direction, but it should be appreciated that this direction is easily reversed by simply reversing the direction in which the drive magnet 40 is rotated.

In operation, and in practicing one possible method of pumping or mixing a fluid disclosed herein, the vessel 16 containing the fluid F and magnetic element 14 are together placed external to the wall 18 of the cryostat 12 adjacent to the superconducting element 20, which is placed in the evacuated or insulated chamber 25. When the first disk-shaped permanent magnet 32 is brought into the proximity of the superconducting element 20, the symmetrical magnetic field generated causes the entire magnetic element 14 to levitate in a stable fashion above the bottom wall of the vessel 16. This levitation brings the second permanent magnet 38 into engagement with the drive magnet 40 to form the desired magnetic coupling. In addition to transmitting the driving torque, this magnetic coupling also serves to stabilize rotation of the magnetic element 14. The motor 42 or other motive device is then engaged to cause the drive magnet 40 to rotate, which in turn induces a steady, stable rotation in the magnetic element 14. Rotating impeller assemblies 36 then serve to mix or pump the fluid F in a gentle, yet thorough fashion.

Since the magnetic element 14 fully levitates and can be completely submerged in the fluid F, the need for mixing or stirring rods penetrating through the vessel 16 in any fashion is eliminated. The concomitant need for dynamic shaft seals or support bearings in the vessel walls is also eliminated. A related advantage is that the vessel 16 and the magnetic element 14 may be sterilized and completely sealed from the outside environment before mixing to provide further assurances against leakage or contamination. Yet another related advantage discussed in detail below is that the vessel 16 and magnetic element 14 can be formed of relatively inexpensive, disposable materials and simply discarded once mixing is complete. As should be appreciated, this advantageously eliminates the need for cleanup and re-sterilization of the magnetic element 14 and vessel 16. Thus, by completely sealing a disposable vessel, such as a plastic container or flexible bag containing the magnetic element 14 and fluid F prior to mixing, the entire assembly can simply be discarded once all or a portion of the fluid contents are recovered. This reduces the risk of exposure both during and after mixing in the case of hazardous fluids, and also serves to protect the fluid from contamination prior to or during the pumping or mixing operation.

Figure 2:
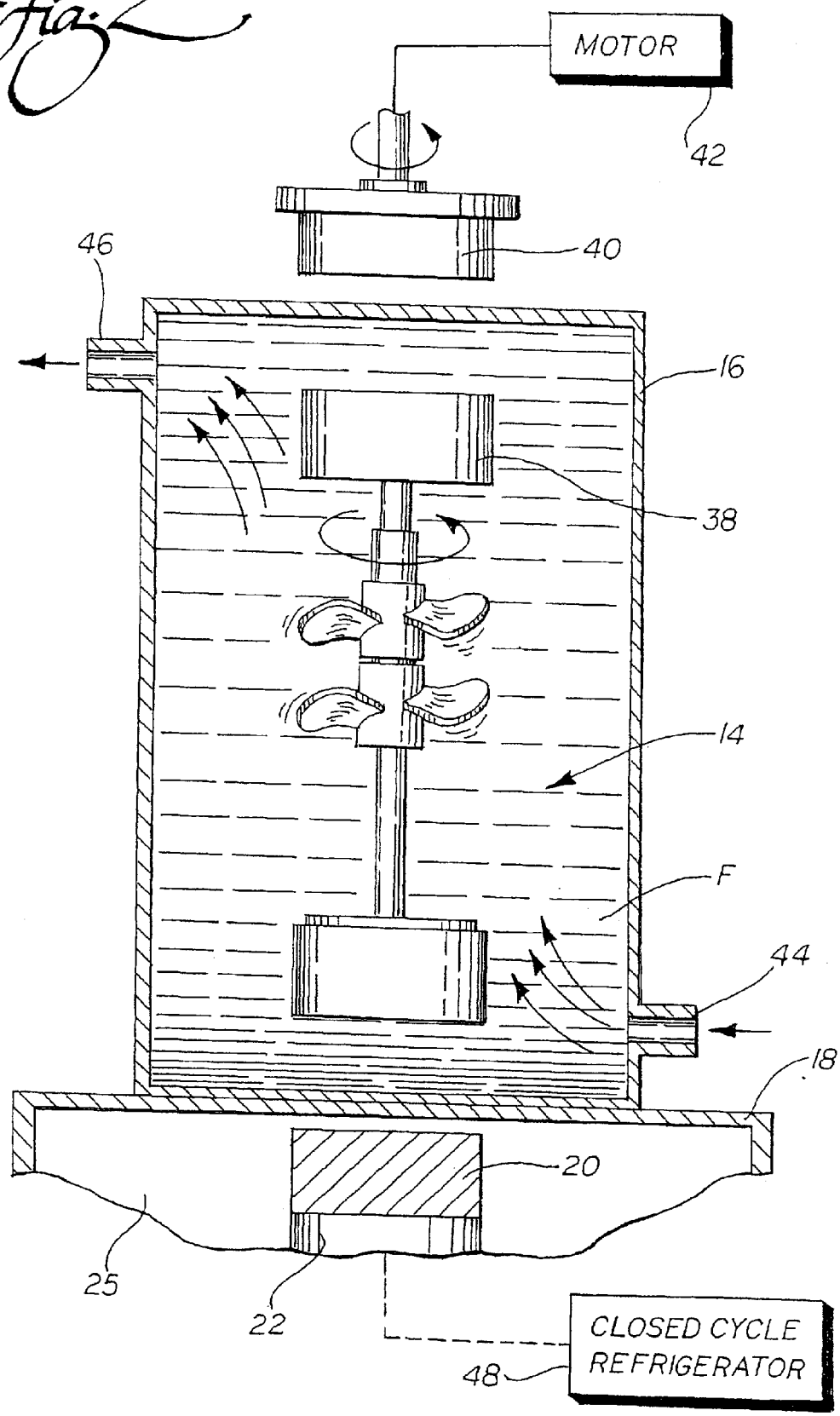
FIG. 2 is an enlarged cross-sectional, partially cutaway, partially schematic view of an embodiment wherein the rotating, levitating magnetic element is used to pump a fluid through a vessel positioned adjacent to the housing for the superconducting element and the cooling source is a closed cycle refrigerator.

An alternative version of this first possible embodiment of the system 10 of the present invention particularly adapted for pumping a fluid F is shown in FIG. 2. In this version, the vessel 16 includes at least one fluid inlet 44 and at least one outlet 46. The magnetic element 14 preferably carries rotating impeller assemblies 36 that serve to provide the desired pumping action by forcing fluid F from the inlet 44 to the outlet 46 (see action arrows). By increasing or decreasing the rotational speed of the motor 42 or other motive device, or adjusting the size, shape or style of the magnetic element 14, impeller blades 36, or substituting a different design altogether, a precise level of pumping action may be provided.

Another possible modification shown in FIG. 2 is to use a closed cycle refrigerator 48 to provide the necessary cooling for the superconducting element 20 instead of a cryostat with a liquid cryogen as the cooling source. The refrigerator 48 can be positioned externally to a housing 18 containing the superconducting element 20, which may be the equivalent of the cryostat outer wall 18 previously described. As with the first embodiment, a chamber 25 is defined by the housing 18. This chamber 25 is preferably evacuated or filled with other insulating materials to minimize thermal transfer from the superconducting element 20 to the housing 18. However, since no cooling source 24 is contained within the housing 18, it is not actually a "cryostat" as that term is commonly defined. Nevertheless, the desired dual levels of thermal separation are still possible, and the concomitant advantages provided, since: (1) the cooling source 24, 48 is positioned away from the housing 18 and, thus, the vessel 16, magnetic element 14, and fluid F; and (2) the housing 18 still separates and defines a chamber 25 that thermally isolates the superconducting element 20 and the vessel 16. In yet another alternate arrangement, the refrigerator 48 can be used as a primary cooling source, with the cryogenic chamber (not shown) serving as a secondary or "backup" cooling source in the event of a power outage or mechanical failure.

Figure 3:
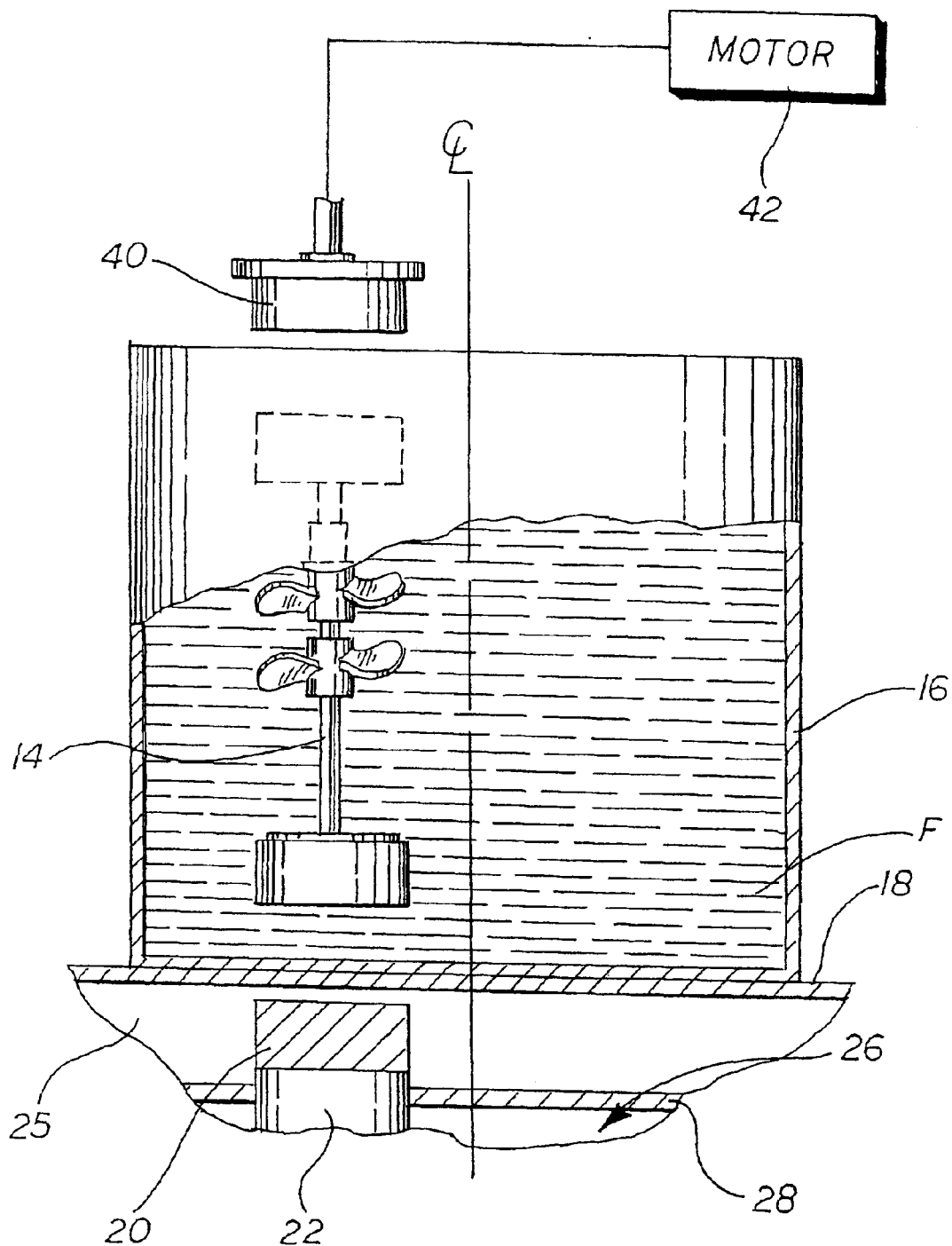
FIG. 3 is a partially cross-sectional, partially cutaway, partially schematic view of the system of the first embodiment wherein the superconducting element, vessel, magnetic element, and drive magnet are axially aligned, but moved off-center relative to the vertical center axis of the vessel.

In accordance with another of the many important aspects of the present system 10, the absence of a mixing rod or other mechanical stirrer extending through a wall of the vessel 16 also allows for placement of the magnetic element 14 at an off-axis position, as shown in FIG. 3. Specifically, the superconducting element 20, magnetic element 14, and drive magnet 40 are all axially aligned away from the vertical center axis of the vessel 16. One particular advantage of using this approach is that the magnetic element 14 may be rotated at a very low speed while the vessel 16 is also rotated about its center axis. This advantageously ensures that gentle, yet thorough mixing, is achieved, which is particularly advantageous for use with fluids that are sensitive to shear stress. As should be appreciated, this arrangement can be used both whether the vessel 16 is completely sealed, provided with an inlet 44 and an outlet 46 for pumping as shown in FIG. 2, or open to the ambient environment. For purposes of illustration only, FIG. 3 shows the cryostat 12 of the embodiment shown in FIG. 1 having an outer wall 18 and a cooling chamber 26 defined by a wall 28. However, it should be appreciated that use of the housing 18 and closed-cycle refrigerator 48 of the second embodiment of FIG. 2 as part of the "cryostat" is also possible with this arrangement.

Through experimentation, it has been discovered that when the magnetic element 14 of the type described for use in this first possible embodiment is employed, providing the requisite degree of stability to ensure that all contact with the side walls of the container 16 is avoided may in some instances be a concern. Thus, to ensure that the magnetic element 14 rotates with exceptional stability and such deleterious contact is completely avoided, the second permanent magnet 38 and the drive magnet 40 are each provided with at least two pairs, and preferably four pairs of cooperating sub-magnets 50a, 50b. As shown in FIGS. 4a and 4b, these magnets 50a, 50b have opposite polarities and thereby serve to attract each other and prevent the levitating magnetic element 14 from moving from side-to-side to any substantial degree. However, the attractive force is counter-balanced by the combined spring-like attractive and repulsive levitational/pinning forces created between the first permanent magnet 32 and the superconducting element 20 when cooled. This avoids the potential for contact with the upper wall of the vessel 16, if present. Overall, the magnetic element 14 is capable of exceptionally stable rotation using this arrangement, which further guards against the undesirable frictional heating or shear stress created if the rotating magnetic element 14, or more particularly, the first and second permanent magnets 32, 38 or the blades of the impeller assemblies 36 could move into close proximity with the bottom or side walls of the vessel 16.

As should be appreciated, it is possible to rearrange the components of the system 10 such that the levitation and driving forces are provided from other areas of the vessel, rather than from the top and bottom of the vessel. Thus, as shown in FIG. 4c, the cryostat 12 or other housing for containing the superconducting element 20 may be positioned adjacent to one side of the vessel 16, while the drive magnet 40 is positioned adjacent to the opposite side. In that case, the magnetic element 14 may be turned on its side and supported by a separate stable support structure, such as a table T or the like. The vessel 16 is shown as being sealed, but it should be appreciated that any of the vessels disclosed herein may be employed instead, including even an open-ended pipe.

To assist in levitating the magnetic element 14 in either the embodiment of FIGS. 1 or 2 or the other embodiments disclosed herein, at least one, and preferably a plurality of chambers 60 are provided for containing a substance that is lighter than the surrounding fluid F. The chambers 60 may be provided adjacent to each magnet 32, 38 in the magnetic element 14, as well as around the shaft 34, if desired. In the preferred embodiment where the fluid F is or has a specific gravity similar to that of water, the substance contained in the chambers 60 may be air. However, in more viscous fluids, such as those having a specific gravity more like glycerin, it may be possible to use lighter fluids, such as water, even lighter gases, or combinations thereof. These chambers 60 thus serve to assist in levitating the magnetic element 14 by helping it "float" in the fluid F. However, the "pinning" force created by the superconducting element 20, plus the levitating and aligning force created between the second permanent magnet 38 and the driving magnet 40, both also serve to assist in keeping the magnetic element 14 in the proper position as it rotates. In the case of disk or pancake shaped permanent first and second magnets 32, 48 and a cylindrical shaft 34, each chamber 60 is preferably annular. Instead of fluid-filled chambers, the use of other buoyant materials is also possible to provide the levitation-assist function.

As previously mentioned, one of the many advantages of the system 10 of the present invention is that, since the magnetic element 14 levitates in the fluid F and no mixing or stirring rods are required for rotation, the vessel 16 can be completely sealed from the outside ambient environment. Thus, by forming the magnetic element 14 and vessel 16 of relatively inexpensive or disposable materials, both can simply be discarded after mixing is completed and the fluid F is recovered. Of course, such disposable materials can also be used to form the vessel 16 designed for pumping fluids (FIG. 2), or to form the open-top container for mixing fluids to avoid the need for clean up or sterilization once the operation is complete.

It should also be appreciated that the magnetic element 14 illustrated is an example of one preferred arrangement only, and that other possible configurations are possible. For instance, impeller blades are not required, since a disk-shaped magnet alone creates some mixing action simply by rotating. If present, the blade or blades could simply be placed circumferentially around the disk-shaped first permanent magnet 32 to reduce the length of the shaft 34, or eliminate it altogether, especially if the vessel 16 has a relatively small vertical dimension. Instead of a bladed impeller assembly 36, the use of other structural arrangements is also possible, such as disk-shaped wheels having vanes or like structures designed to create more or less efficient rotation, and a concomitant increase in the desired mixing or pumping action when rotated. Depending on the depth of the vessel 16, the length of the shaft 34, if present, can also be increased or decreased as necessary. All components forming the magnetic element in any embodiment described above may be coated with TEFLON or other inert materials to reduce the chances of contamination or corrosion, as well as to facilitate clean up, if required.

Of course, besides use in the mixing or pumping of small batches of fluid solutions or suspensions used during experimentation and research in the laboratory setting, all components are also easily scaled up for use in industrial or commercial pumping or mixing operations, such as those commonly used in the manufacture of pharmaceuticals on a large-scale basis. The levitation of the magnetic element 14 can still be readily achieved in systems of much greater capacity than the one shown for purposes of illustration in the drawings, thus making the present arrangement particularly well-suited for the commercial production of pharmaceuticals or any other solutions or suspensions that require gentle, yet thorough mixing during processing.

Experiments conducted to date have demonstrated the efficacy of the system 10 described above. The set-up utilized in conducting these experiments included a magnetic element having axially aligned upper and lower magnets and an impeller assembly mounted on a vertically extending support shaft, as shown in FIG. 1. A cylindrical pellet of melt-textured $YBa_2Cu_3O_{7+x}$ having a diameter of 30 millimeters and a thickness of 25 millimeters was used as the superconducting element and placed in a cryostat having a configuration similar to the one shown in FIG. 1. The cryostat included a cooling chamber filled with approximately 1 liter of liquid nitrogen. A Nd—Fe—B permanent magnet with a surface field intensity of 0.4 Tesla was used as the lower, first permanent magnet.

Experiments conducted using this set-up demonstrated that the desired exceptionally stable levitation of the magnetic element above the top surface of the cryostat in a vessel filled with a relatively warm (i.e., about room temperature) fluid was possible. A separation distance of up to seven millimeters was achieved, and the levitation was stable for up to five hours using just a liter of liquid nitrogen as the cryogen. In the first experiment using this set up, water was selected as a model low viscosity fluid. Rotational speeds of up to 600 rpm were achieved—this upper limit being defined by only the limited capabilities of the motor used to rotate the drive magnet in this experiment. No decoupling or instability in the magnetic element was observed at any speed. In the case of glycerin, a model high viscosity fluid, a maximum rotational speed of 60 rpm was achieved before some decoupling of the magnetic element was observed. To further demonstrate the mixing capabilities using the proposed system, SEPHADEX powder (dry bead, 50–150 micron diameter) was placed on the bottom of a water-filled vessel and the levitating magnetic element rotated. A uniform suspension was achieved after approximately five minutes of mixing.

As should be appreciated, the system 10 described above and shown in FIGS. 1–4 is based on a stationary superconducting element 20 and a magnetic element 14 that, in addition to a "levitation" magnet, includes one or more separate driven magnets for coupling with a drive mechanism positioned at the opposite end of the vessel or container relative to the superconducting element. However, other embodiments of the pumping or mixing system may include a levitating, rotating pumping or mixing element with magnets that are simultaneously used not only for levitation, but also for transmitting driving torque. In one embodiment, this driving torque is provided by the pinning forces that couple the magnetic element with a rotating superconducting element. Thus, the superconducting element causes the magnetic pumping or mixing element to rotate, even though there is no physical contact between the two.

Figure 5:
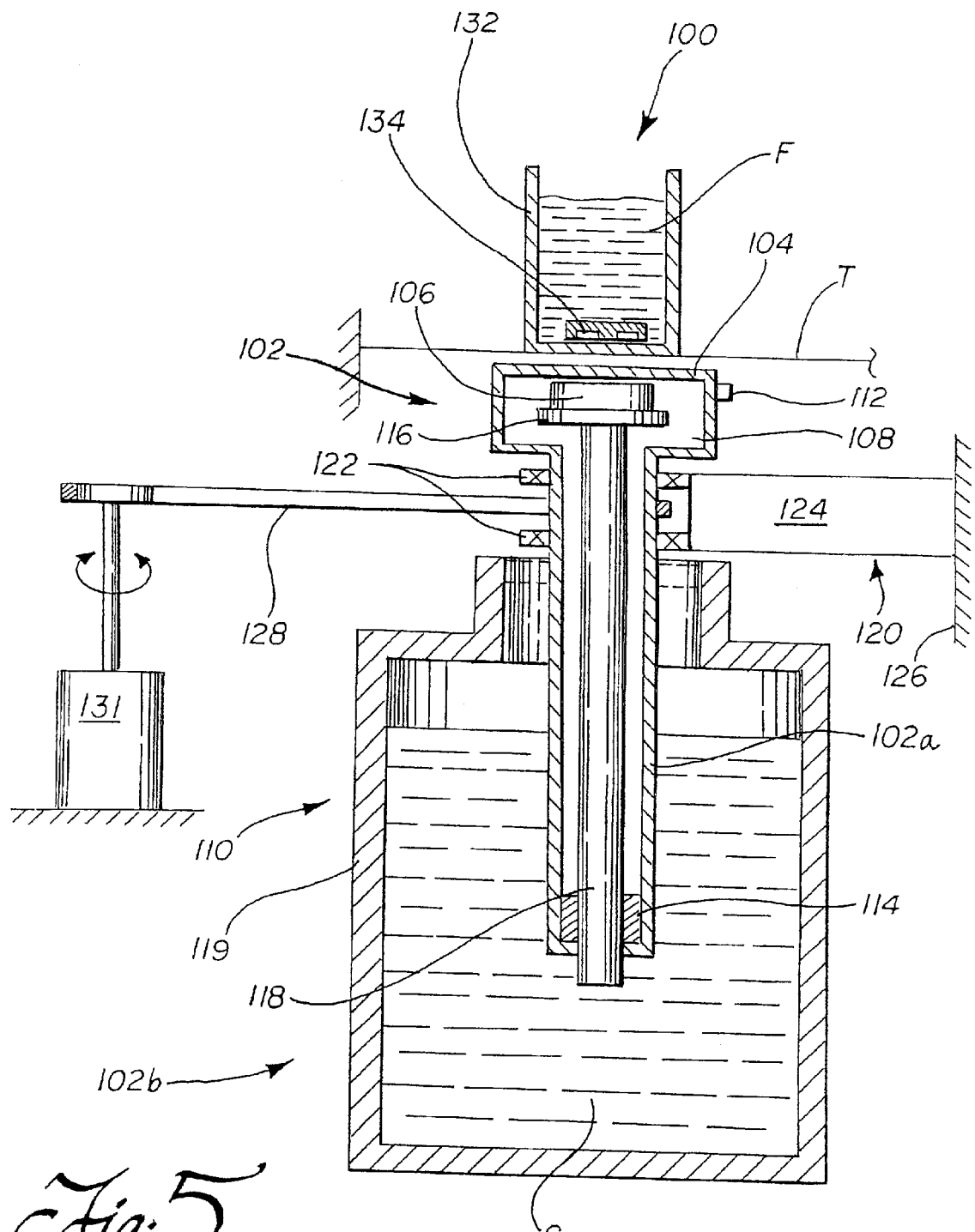
FIG. 5 is a partially cross-sectional, partially schematic side view of a second possible embodiment of a pumping or mixing system using a magnetic element levitated by a thermally isolated cold superconducting element wherein the motive force for rotating the element in the vessel is provided by rotating the superconducting element itself.

More specifically, and in accordance with this second possible embodiment of the present invention illustrated in FIG. 5, the pumping or mixing system 100 includes a cryostat 102, which may be formed of two separate components: a first component 102a including an outer wall 104 that surrounds a relatively thin, disk-shaped superconducting element 106 to define a chamber 108, and a second component 102b including the cooling source 110. Preferably, the outer wall 104 is formed of thin, non-magnetic material, such as non-magnetic stainless steel or the like, but the use of other materials is possible, as long as they do not interfere with the operation of the system 100 and have relatively poor thermal conductivity. The chamber 108 surrounding the superconducting element 106 may be evacuated or insulated as described above to thermally isolate and separate it from the wall 104. However, as noted further below, it is possible to eliminate the chamber 108 entirely in the case where a non-temperature sensitive fluid is being pumped or mixed.

In the case where the chamber 108 is evacuated, a valve 112 may be provided in the outer wall 104 for coupling to a vacuum source, and an optional getter 114 (such as an activated carbon insert or the like) may be positioned in the chamber 108 for absorbing any residual gases and ensuring that the desired evacuation pressure is maintained. As with the embodiments described above, the evacuation pressure is preferably on the order of $10^{-3}$ torr or greater.

The superconducting element 106 is supported in the chamber 108 independent of the outer wall 104 of the first portion 102a of the cryostat 102. The support may be provided by a platform 116 that is in turn enclosed by wall 104 and supported at one end of an elongated thermal link 118, preferably formed of metal or another material having a high degree of thermal conductivity (e.g., 50 Watts/Kelvin or higher). To supply the necessary cooling to the superconducting element 106, the opposite end of the elongated thermal link 118 is positioned in contact with the cooling source 10, which as described above forms a part of the second component 102b of the "cryostat" 102 (the term cryostat being used throughout to denote a structure or combination of structures that are capable of holding and maintaining a superconducting element in a state such that levitation is induced in a permanent magnet, whether forming a single unit or not, and regardless of the temperatures required). The cooling source 110 is illustrated as an open-top container 119, such as a Dewar flask, containing a liquid cryogen C, such as nitrogen. However, it is also possible to use a closed-cycle refrigerator or any other device capable of supplying the cooling necessary to levitate a magnet above a superconducting element after field cooling is complete. In the case where the wall 104 of the first portion 102a of the cryostat 102 makes contact with the cryogenic fluid C, as illustrated, it should be appreciated that there is only negligible thermal transfer to the portion of the wall 104 adjacent the vessel, since: (1) the wall 104 may be formed of a thin material having low thermal conductivity; and (2) the portion of the wall 104 adjacent to the vessel is surrounded by the ambient, room-temperature environment.

To permit the superconducting element 106 to rotate, a roller bearing assembly 120 comprising one or more annular roller bearings 122 supports the first portion of the cryostat 102a, including the wall 104 defining the chamber 108. As should be appreciated from viewing FIG. 5, these roller bearings 122 permit the first portion of the cryostat 102a housing the superconducting element 102 to rotate about an axis, which is defined as the axis of rotation. A bearing housing 124 or the like structure for supporting the bearing (s) 122 is secured to an adjacent stable support structure 126. In the illustrated embodiment, a motive device includes an endless belt 128 that serves to transmit rotational motion from the pulley 129 keyed or attached to the shaft 130 of a motor 131 to the first portion of the cryostat 102a. The motor 131 may be a variable speed, reversible electric motor, but the use of other types of motors to create the rotary motion necessary to cause the superconducting element 106, and more particularly, the first portion of the cryostat 102a, to rotate is possible.

The vessel 132 containing the fluid to be mixed (which as described below can also be in the form of a centrifugal pumping head for transmitting a fluid) is positioned adjacent to the rotating superconducting element 106, preferably on a stable support surface T fabricated of a material that does not interfere with the magnetic field created by the bearing 134. As previously noted, the vessel 132 can be a rigid vessel of any shape (open top, sealed having an inlet or outlet, cylindrical with a hollow center, such as a pipe, or even a flexible plastic bag (by itself, with rigid inserts, or inserted into a rigid or semi-rigid vessel)). The only requirement is that the vessel 132 employed is capable of at least temporarily holding the fluid F (or gas) being mixed or pumped.

To create the desired mixing action in this embodiment, a magnetic element 134 is positioned in the vessel 132 and simultaneously levitated and rotated by the superconducting element 106. More specifically, the first portion of the cryostat 102a containing the superconducting element 106, thermal link 118, and the evacuated chamber 108 is rotated as a result of the rotational motion transmitted by the endless belt 128. This rotation causes the magnetic element 134 in the vessel 124 to rotate and either pump or mix the fluid F held therein. In the case where the chamber 104 is evacuated or insulated, the magnetic element 134 is rotated in a stable, reliable fashion while the desired thermal separation between the cold superconducting element 106 supplying the levitation force, the vessel 124, and hence the fluid F, is achieved. The magnetic element 134 may include a plurality of mixing blades B (see FIGS. 6a and 6b), vanes V (not shown, but see FIG. 7), or like structures to create an impeller. However, again referring back to FIG. 5, a low-profile, disk-shaped magnetic element 134 may also be used to provide the desired mixing action, especially for particularly delicate fluids, such as blood or other types of cell suspensions.

Figure 6A:
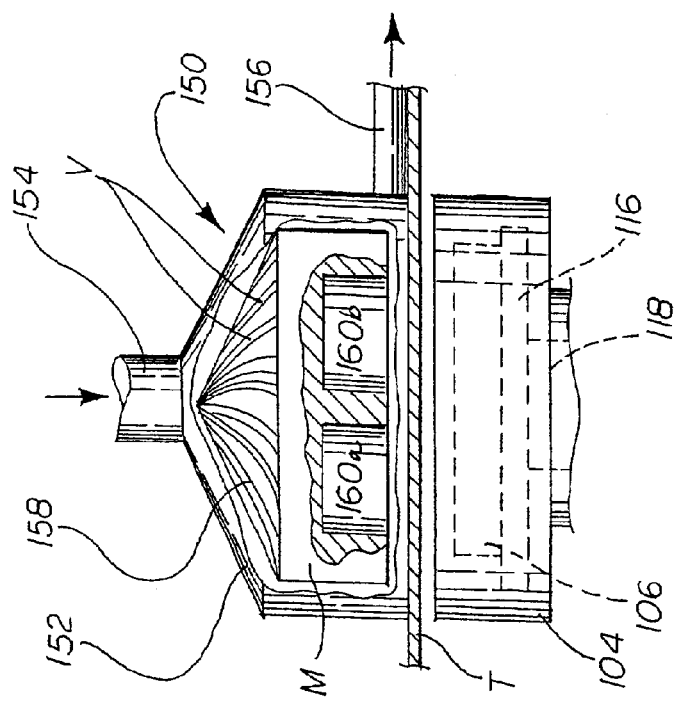
FIG. 6a is a top schematic view of one possible arrangement of the levitating magnetic element that may be driven by a rotating superconducting element.
Figure 6B:
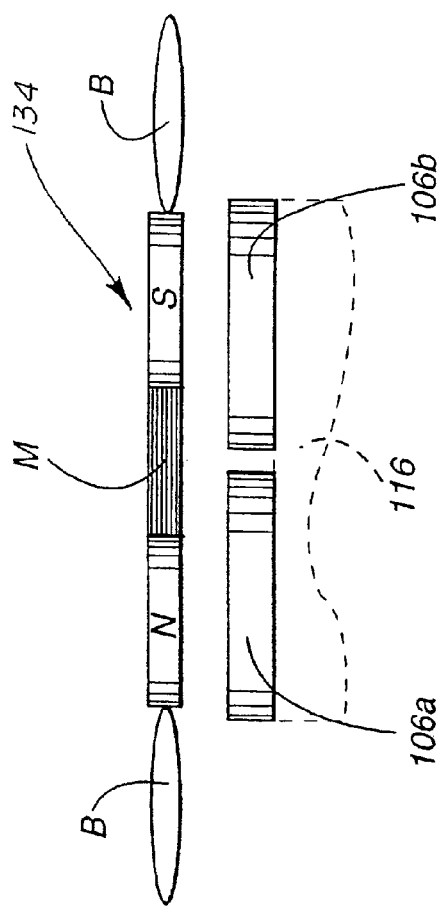
FIG. 6b shows the magnetic element of FIG. 6a levitating above a rotating superconducting element formed of two component parts.

As perhaps best understood by viewing FIGS. 6a and 6b together, the magnetic element 134 may include at least two magnets 135a, 135b. These magnets 135a, 135b not only serve to generate the magnetic field that causes the magnetic element 134 to levitate above the superconducting element 106, but also transmit rotational motion thereto. As should be appreciated by one of ordinary skill in the art, the magnetic field generated by the magnets 135a, 135b must be axially non-symmetrical relative to the axis of rotation of the superconducting element 106 in order to create the magnetic coupling necessary to efficiently transmit the rotary motion. In one embodiment, the magnets 135a, 135b are disk-shaped and polarized along a center vertical axis (see FIG. 6b, showing permanent magnets 135a, 135b of alternating polarities (S—South; N—North) levitating above a pair of superconducting elements 106a, 106b, with the corresponding action arrows denoting the direction and axis of polarity). These magnets 135a, 135b can be fabricated from a variety of known materials exhibiting permanent magnetic properties, including, but not limited to, Neodymium-Iron-Boron (NdFeB), Samarium Cobalt (SmCo), the composition of aluminum, nickel, and cobalt (Alnico), ceramics, or combinations thereof. The magnets 135a, 135b maybe connected by a piece of a matrix material M, such as plastic. Alternatively, the magnets 135a, 135b may each be embedded in separate pieces of a matrix material M, or may be embedded in a single unitary piece of material (not shown). Also, as previously mentioned, the magnetic element 134 may carry one or more optional blades B, vanes or like structures to enhance the degree of pumping or mixing action supplied during rotation.

In another possible embodiment, the second portion of the cryostat 102b including the cooling source (either a liquid cryogen container (open top, sealed with inlet/outlet ports, or a refrigerator)) may be rigidly attached to the first portion 102a and both components may be simultaneously rotated together (see the dashed lines at the top of the open cooling container 119 in FIG. 5). The rotational motion may be supplied by an endless belt/motor combination, as described above, or alternatively may be provided through a direct coupling between the second portion of the cryostat 102b (comprising any type of cooling source) and an inline shaft of a motor or similar motive device (not shown).

As briefly mentioned above, it is possible to use this embodiment of the system 100 without evacuating, insulating, or otherwise thermally separating the superconducting element 106 from the ambient environment, such as for mixing or pumping cold (cryogenic) or non-temperature sensitive fluids. In that case, there is no specific need for a wall 104 or chamber 108 surrounding the superconducting element 106, since there is no need for thermally separating it from the structure supporting the vessel 132. Even with this modification, reliable and stable levitation of the magnetic element 134 is still possible.

Figure 7:
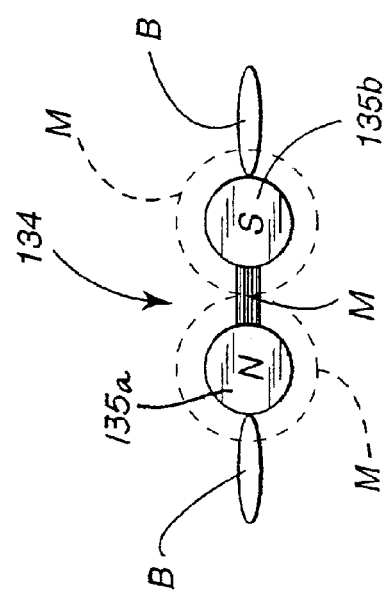
FIG. 7 is a partially cutaway, partially cross-sectional schematic side view of a vessel in the form of a centrifugal pumping head, including a levitating, rotating magnetic element for pumping fluid from the inlet to the outlet of the centrifugal pumping head.

From the foregoing, it should be appreciated that the same driving mechanism and cryostat shown in FIG. 5 can be used for pumping a fluid instead of mixing it. One version of a container or vessel 132 in the form of a centrifugal pumping head 150 is shown in FIG. 7. This pumping head 150 includes a pumping chamber 152 having an inlet 154 and an outlet 156 (which of course, could be reversed, such as in a non-centrifugal pumping head (see FIG. 2)). The chamber 150 contains the levitating magnetic element 158, which as shown may include a plurality of vanes V, or may alternatively carry a plurality of blades (not shown). At least two permanent magnets 160a, 160b having different polarities are embedded or otherwise included in the magnetic element 158, which maybe substantially comprised of an inert matrix material M having any particularly desired shape to facilitate the pumping or mixing action. As described above, these magnets 160a, 160b provide both levitation and torque transmission as a result of the adjacent rotating superconducting element 106.

As should be appreciated, one advantage of providing the driving force for the levitating magnetic element 158 from the same side of the vessel/pumping head 150 from which the levitating force originates is that the fluid inlet 154 (or outlet 156, in the case where the two are reversed) may be placed at any location along the opposite side of the vessel/pumping head 150, including even the center, without interfering with the pumping or mixing operation. Also, this same side of the vessel/pumping head 150 may be frusto-conical or otherwise project outwardly, as illustrated, without interfering with the driving operation or necessitating a change in the design of the magnetic element 134, 158.

Figures 8A, 8B:
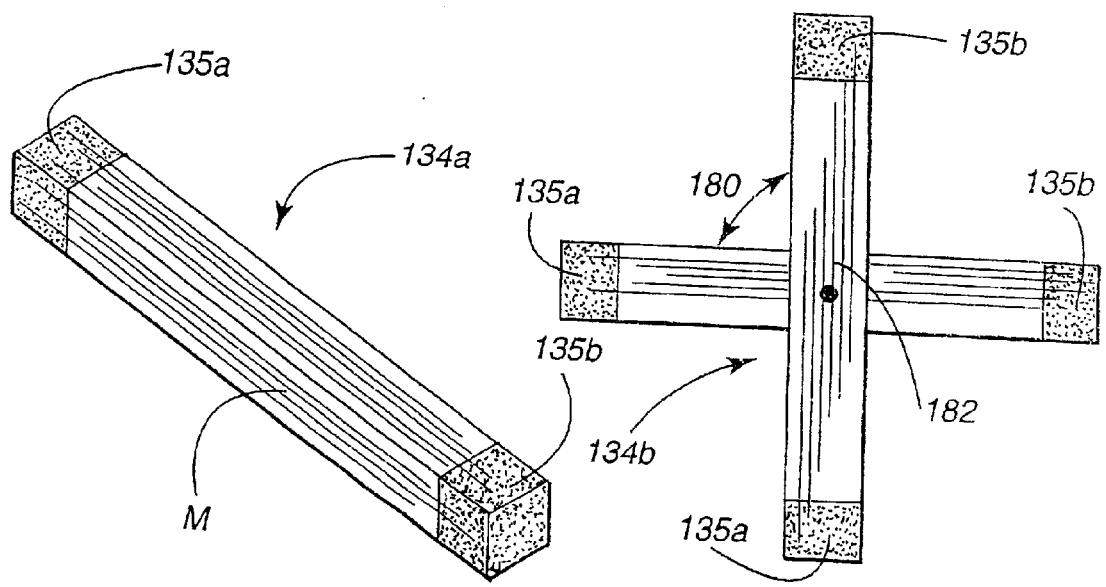
FIG. 8a shows an alternate embodiment of a magnetic element especially adapted for use in a vessel or container having a relatively narrow opening.
FIG. 8b shows another alternate embodiment of a magnetic element adapted especially for use in a vessel or container having a relatively narrow opening.

As briefly noted above, in some instances the opening in a vessel may be too small to permit an even moderately sized pumping or mixing element 134 to be inserted into the fluid F. In such a case, alternate versions of a magnetic element 134 meeting this particular need are shown in FIGS. 8a–8c. In the first alternate version, the magnetic element 134a is in the form of a slender rod formed of an inert matrix material M carrying one of the levitating/driven magnets 135a, 135b at or near each end. As should be appreciated, this pumping or mixing element 134a may be easily turned to an upstanding position and inserted in the opening. Upon then coming into engagement with the rotating superconducting element 106, the pumping or mixing element 134a would simultaneously levitate and rotate to pump or mix a fluid held in the vessel. To further facilitate insertion in the narrow opening, the matrix material M may be an elastomeric material or another material having the ability to freely flex or bend.

A second version of a pumping or mixing element 134b for use with a vessel having a narrow opening is shown in FIG. 8b. The pumping or mixing element 134b includes first and second thin rods 180 formed of a matrix material M. The rods 180 each carry the levitating/driven magnets 135a, 135b at each end thereof, with at least two magnets having the identical polarity being held on each different rod. In one version, the rods 180 are pinned about their centers (note connecting pin 182) and are thus capable of folding in a scissor-like fashion. As should be appreciated from FIG. 8c, this allows the pumping or mixing element 134b to be folded to a low-profile position for passing through the opening of the vessel 124. The rods 182 of the pumping or mixing element 134b may then separated upon coming into engagement with the rotating superconducting element 106 positioned adjacent to the bottom of the vessel 132. Since magnets 135a or 135b having the same polarity are positioned adjacent to each other, the corresponding ends of the rods 180 repel each other as the pumping or mixing element 134b rotates. This prevents the rods 180 from assuming an aligned position once in the vessel 132. As should be appreciated, instead of pinning two separate rods 180 together to form the pumping or mixing element 134b, it is also possible to integrally mold the rods 180 of a flexible material to form a cross. This would permit the rods 180 of the pumping or mixing element 134b to flex for passing through any narrow opening, but then snap-back or otherwise return to the desired configuration for levitating above the superconducting element 106.

In accordance with yet another aspect of the present invention, a third version of a pumping or mixing system 200 is disclosed. In this third embodiment, which is illustrated in FIGS. 9, 9a, 9b, and 10, the forces for driving and levitating the pumping or mixing element 204 are supplied from the same side of a fluid vessel 202 (which is shown as an open-top container, but as described above, could be a sealed container, a pumping chamber or head, a flexible bag, a pipe, or the like). In this system 200, the pumping or mixing element 204 actually includes two magnetic subsystems: a first one that serves to levitate the pumping or mixing element 204, which includes a first magnet 206, preferably in the form of a ring, and a second magnetic subsystem that includes at least two alternating polarity driven magnets 208a, 208b, preferably positioned inside of the first, ring-shaped magnet 206, to transmit driving torque to the magnetic element (see FIGS. 9a and 9b).

Figure 9B:
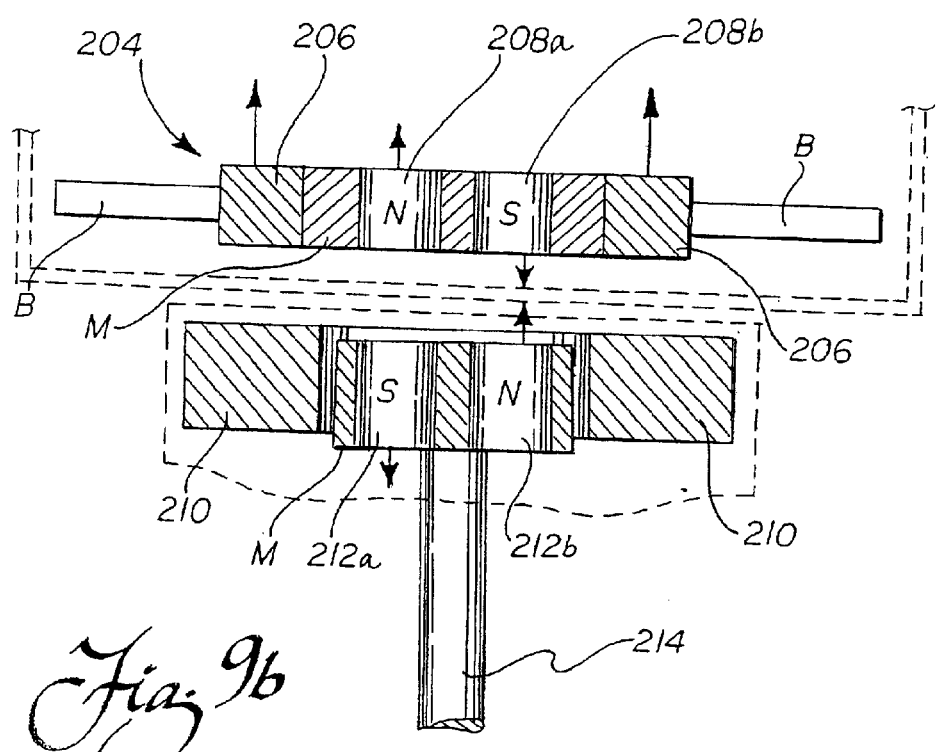
FIG. 9b is a partially cross-sectional side view of the magnetic element of FIGS. 9 and 9a levitating above the superconducting element, and illustrating the manner in which the driven magnets are coupled to the corresponding driving magnets to create the desired rotational motion.
Figure 9:
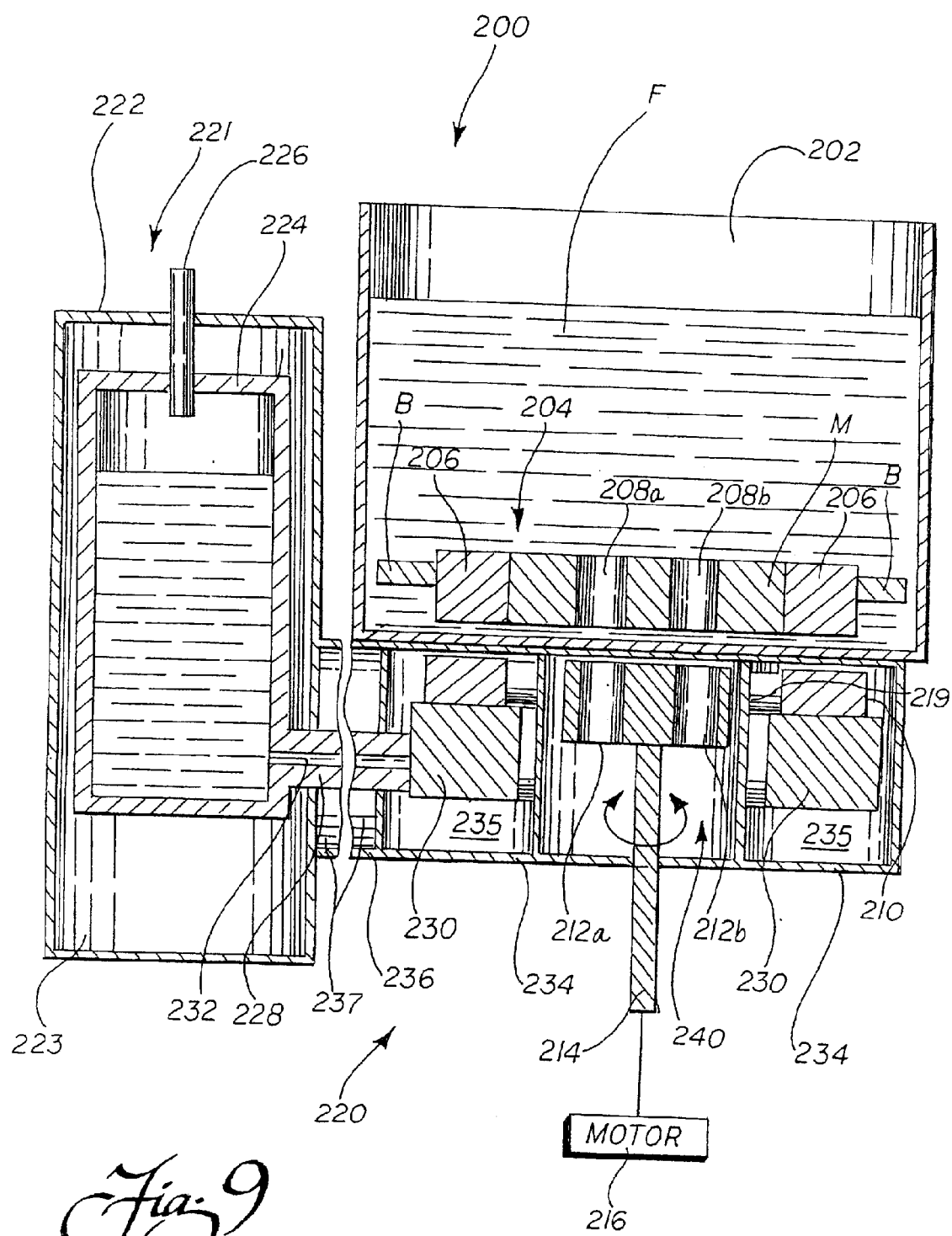
FIG. 9 is a partially cross-sectional, partially schematic side view of a second embodiment of a pumping or mixing system wherein separate levitating and driven magnets are carried on the same, low-profile magnetic element, with the levitation being supplied by a thermally isolated superconducting element and the rotary motion being supplied a motive device including driving magnets coupled to a rotating shaft and positioned in an opening in the evacuated or insulated chamber for housing the superconducting element.

FIG. 9 shows one embodiment of the overall system 200 in which the ring-shaped permanent magnet 206 provides the levitation for the pumping or mixing element 204. Polarization of the ring magnet 206 is vertical (as shown by the long vertical arrows in FIG. 9b). The driven magnets 208a, 208b are shown being disk-shaped and having opposite or alternating polarities (see corresponding short action arrows in FIG. 9b representing the opposite polarities) to form a magnetic coupling and transmit the torque to the levitating pumping or mixing element 204. Levitation magnet 206 and driven magnets 208a, 208b are preferably integrated in one rigid structure such as by embedding or attaching all three to a lightweight, inert matrix material M, such as plastic or the like.

To correspond to the ring-shaped levitation magnet, the superconducting element 210 for use in this embodiment is annular, as well. This superconducting element 210 can be fabricated of a single unitary piece of a high-temperature superconducting material (YBCO or the like), or may be comprised of a plurality of component parts or segments. Upon being cooled to the transition temperature in the presence of a magnetic field and aligning with the ring-shaped permanent magnet 206 producing the same magnetic field, the superconducting ring 210 thus provides the combined repulsive/attractive, spring-like pinning force that levitates the pumping or mixing element 204 in the vessel 202 in an exceptionally stable and reliable fashion. In FIG. 9, the vessel is shown as being supported on the outer surface of a special cryostat 220 designed for use with this system 200, a detailed explanation of which is provided in the description that follows. However, it is within the broadest aspects of the invention to simply support the vessel 202 on any stable support structure, such as a table (not shown), as long as it remains sufficiently close to the superconducting element 210 to induce the desired levitation in the pumping or mixing element 204 held therein.

As in the embodiments described above, a motive device is used to impart rotary motion to the pumping or mixing element 204, and is preferably positioned adjacent to and concentric with the annular superconducting element 210. One example of a motive device for use in the system 200 of this third embodiment includes driving magnets 212a, 212b that correspond to the driven magnets 208a, 208b on the pumping or mixing element 204 and have opposite polarities to create a magnetic coupling (see FIG. 9). The driving magnets 212a, 212b are preferably coupled to a shaft 214 also forming part of the motive device. The driving magnets 212a, 212b may be attached directly to the shaft 214, or as illustrated in FIG. 9, may be embedded or attached to a matrix material (not numbered in FIG. 9, but see FIG. 9b). By positioning the driving magnets 212a, 212b close to the pumping or mixing element 204, such as by inserting them in the opening or bore 219 defined by the annular superconducting element 210, and rotating the shaft 214 using a motor 216 also forming a part of the motive device, synchronous rotation of the levitating pumping or mixing element 204 is induced. The pumping or mixing element 204 may include one or more blades B that are rigidly attached to the ring or levitation magnet 206 (or any matrix material forming the periphery of the pumping or mixing element 204). However, it remains within the broadest aspects of the invention to simply use a smooth, low-profile magnetic element (see FIG. 5) to provide the desired mixing action.

Figure 10:
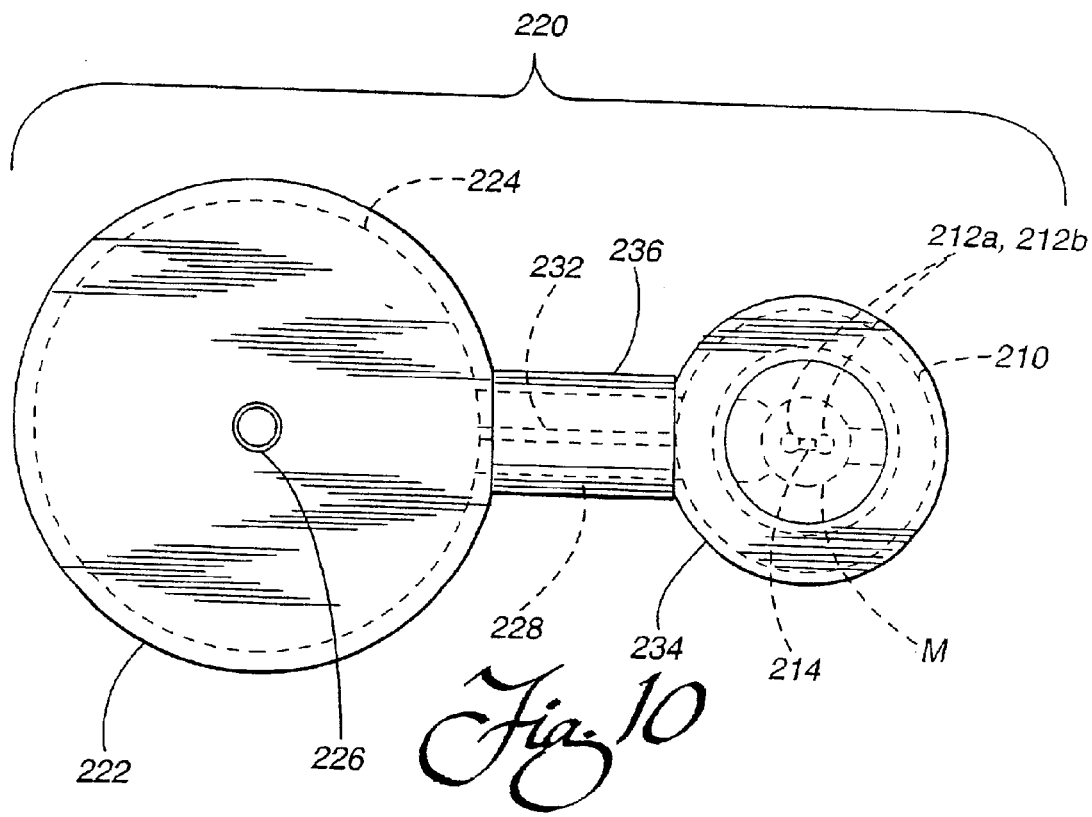
FIG. 10 is a top view of a most preferred version of a cryostat for use with the pumping and mixing system of the embodiment of FIG. 9.

As shown in FIGS. 9 and 10 and briefly mentioned above, the mixing or pumping system 200 including the pumping or mixing element 204 comprised of the magnetic levitation ring 206 and separate driven magnets 208a, 208b may use a special cryostat 220 to ensure that reliable and stable rotation/levitation is achieved. As perhaps best shown in the cross-sectional side view of FIG. 9, the cryostat 220 includes a cooling source 221 for indirectly supplying the necessary cooling to the superconducting element 210, which as described below is supported and contained in a separate portion of the special cryostat 220. In the illustrated embodiment, the cooling source 221 (not necessarily shown to scale in FIG. 9) includes a container 222, such as a double-walled Dewar flask, in which a first chamber 224 containing a liquid cryogen C (nitrogen) is suspended. A second chamber 223 defined around the first chamber 224 by the double wall container 222 is preferably evacuated or insulated to minimize thermal transfer to the ambient environment, which is normally at room temperature. A port 226 is also provided for filling the suspended chamber 222 with the chosen liquid cryogen C, as well as for possibly allowing any exhaust gases to escape. As with the first and second embodiments described above, the cooling source 221 may instead take the form of a closed-cycle refrigerator (not shown), in which case the double wall container 222 may be entirely eliminated from the system 200.

A thermal link 228 is provided between the cooling source (in the illustrated embodiment, the container 222) and a platform 230 suspended in the cryostat 220 for supporting the superconducting ring 210. The use of the platform 230 is desirable to ensure that the temperature of the superconducting element 210 is kept below the transition temperature, which in the case of a "high temperature" superconducting material (such as YBCO) is most preferably in the range of between 87–93 Kelvin. However, the use of the platform 230 is not critical to the invention or required as part of the special cryostat 220, since the thermal link 228 could extend directly to the superconducting element 210. The thermal link 228 may be a solid rod of material, including copper, brass, aluminum or any other material having a relatively high thermal conductivity. Instead of a solid rod, it is also possible to provide an open channel 232 in the thermal link 228, especially when a liquid cryogen C capable of flowing freely, such as nitrogen, is used as the cooling source 221. This channel 232 allows the cryogen C from the suspended container 224 to reach the platform 230 directly. Of course, the direct contact with the cryogen C may provide more efficient and effective cooling for the superconducting element 210.

The ring-shaped platform 230 that supports the superconducting element(s) 210 and supplies the desired cooling via thermal conduction may be made of copper, brass, aluminum, or another material having good thermal conductivity. It may be in the form of a solid ring, as illustrated, or may be in the form of a hollow ring (such as a substantially circular or elliptical torus, not shown). This would allow the liquid cryogen C to flow completely around the ring to further increase the efficiency with which the cooling is transferred to the superconducting element 210. In any case, where a platform 230 is used, care should be taken to ensure that full contact is made with at least a majority of the corresponding surface of the superconducting element 210 to ensure that the desired smooth, even, and reliable levitation is achieved.

To reduce the thermal transfer to the vessel 202 in the case where a temperature sensitive fluid is being pumped or mixed by the system 200, a ring-shaped wall or enclosure 234 surrounding the platform 230 and the annular superconducting element 210 defines a first chamber 235. In addition, a hollow cylindrical wall or enclosure 236 may also surround the thermal link 232 and define a second chamber 237. Preferably, these first and second chambers 235, 237 are evacuated or insulated to minimize thermal transfer between the ambient environment and the cold elements held therein. In a preferred embodiment, each enclosure 234, 236 is fabricated from non-magnetic stainless steel, but the use of other materials is of course possible, as long as no interference is created with the levitation of the magnetic element 204. As with the second embodiment described above, it is also possible to use the system 200 of the third embodiment to pump or mix cryogenic or non-temperature sensitive fluids, in which case there is no need to evacuate or insulate the enclosures 234, 236, or to even use the special cryostat 220 described herein.

As should be appreciated, it is possible to create the chambers 235, 237 defined by the enclosures 234, 236 and the chamber 223 such that all three are in fluid communication and thus represent one integrated vacuum space (not shown). This facilitates set-up, since all three chambers 223, 235, 237 may be evacuated in a single operation, such as by using a vacuum source coupled to a single valve (not shown) provided in one of the chambers. However, separately evacuating each chamber 223, 235, 237 is of course entirely possible. Also, instead of evacuating the chambers 223, 235, 237, some or all may be instead filled with an insulating material (not shown).

As should be appreciated, to rotate the pumping or mixing element 204 in this embodiment, it is desirable to place the drive magnets 212$a$, 212$b$ in close proximity to the magnetic element, but preferably on the same side of the vessel 202 as the superconducting element 210. Accordingly, the special cryostat 220, and more specifically, the wall or enclosure 234 defines a room-temperature cylindrical bore or opening 240 that allows for the introduction of the end of the shaft 214 carrying the driving magnets 212$a$, 212$b$, which are at room temperature. As a result of this arrangement, the shaft 214, which is part of the motive device, is concentric with the superconducting element 210. The shaft 214 is also positioned such that the driving magnets 212$a$, 212$b$ align with the driven magnets 208$a$, 208$b$ on the pumping or mixing element 204 when the levitating magnet 206 is aligned with the superconducting element 210. Thus, despite being positioned adjacent to and concentric with the superconducting element 210, the shaft 214 and driving magnets 212$a$, 212$b$ remain at room temperature, as does the vessel 202, the fluid F, and the pumping or mixing element 204.

Figure 11:
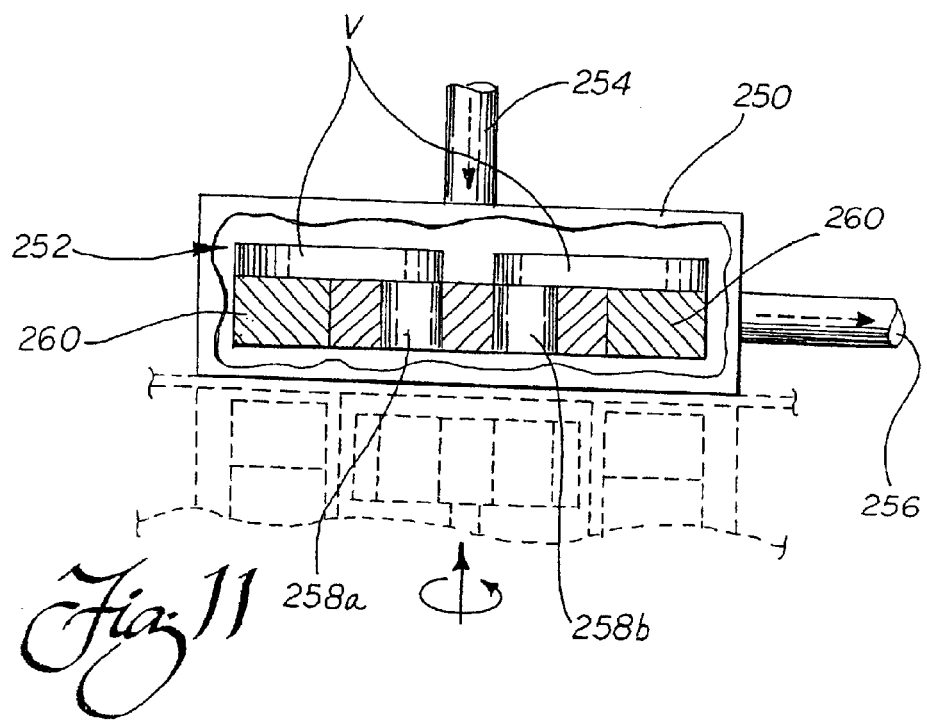
FIG. 11 is a partially cutaway, partially cross-sectional side schematic view of a centrifugal pumping head for use with the system of FIG. 9.

An example of one possible embodiment of a centrifugal pumping head 250 for use with the system 200 of FIG. 9 is shown in FIG. 11. The head 250 includes a levitating magnetic element 252 that carries one or more optional blades or vanes V (which are upstanding in the side view of FIG. 11), a fluid inlet 254 (which as should be appreciated can be in the center at one side of the pumping head 250 in view of the fact that the levitation and driving forces are both supplied from the same side of the vessel 202), a fluid outlet 256, driven magnets 258$a$, 258$b$, and a ring shaped levitation magnet 260.

Figure 12:
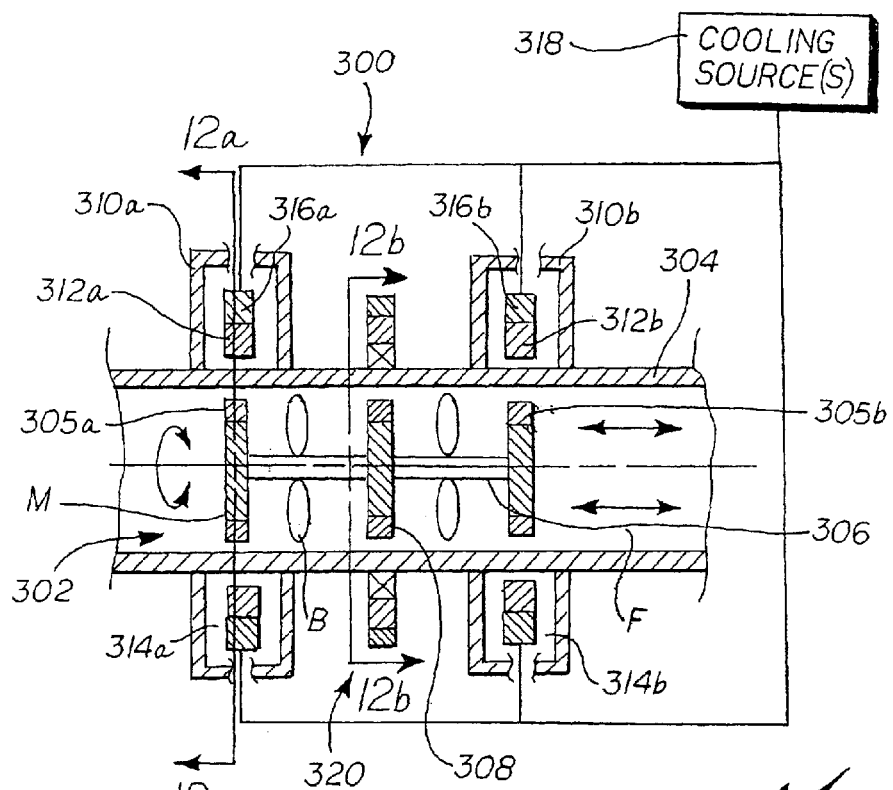
FIG. 12 is a cross-sectional side view of another possible embodiment of a pumping or mixing system of the present invention.

In yet another possible embodiment of the invention, as shown in the cross-sectional view of FIG. 12, the system 300 includes a pumping or mixing element 302 adapted for inline use, such as when the vessel is in the form of a hollow pipe 304. The pumping or mixing element 302 includes first and second spaced levitating magnets 305$a$, 305$b$, one of which is preferably positioned at each end to ensure that stable levitation is achieved. The magnets 305$a$, 305$b$ preferably correspond in shape to the vessel, which in the case of a pipe 304, means that the magnets are annular. The magnets 305$a$, 305$b$ are carried on a shaft 306 forming a part of the pumping or mixing element 302, which further includes a driven magnet 308. The driven magnet 308 may be comprised of a plurality of sub-magnets 308$a$ ... 308$n$ having different polarities and arranged in an annular configuration to correspond to the shape of the pipe 304 serving as the vessel in this embodiment (see FIG. 12$b$). All three magnets 305$a$, 305$b$, and 308 may be embedded or attached to an inert matrix material M, such as plastic, that provides the connection with the shaft 306. The shaft 306 of the pumping or mixing element 302 may also carry one or more blades B.

First and second cryostats 310a, 310b may also be provided. As perhaps best understood with reference to the cross-sectional view of FIG. 12a, the first "cryostat" 310a includes a superconducting element for levitating the magnetic element in the form of an annular superconducting element 312a. The superconducting element 312a is suspended in a chamber 314a defined by the cryostat 310a, which may be evacuated or insulated to prevent thermal transfer to the pipe 304 or the passing fluid F. The cryostat 310a may include an inner wall adjacent to the outer surface of the pipe 304 (not shown), but such a wall is not necessary in view of the thermal separation afforded by the evacuated or insulated space surrounding the superconducting element 312a. The superconducting element 312a may be coupled to annular support platform 316a, which in turn is thermally linked to one or more cooling sources 318. The connection is only shown schematically in FIG. 12, but as should be appreciated from reviewing the foregoing disclosure, may include a rod that serves to thermally link a container holding a liquid cryogen or a closed cycle refrigerator to the superconducting element 312a. While not shown in detail, "cryostat" 310b may be identical to the cryostat 310a just described.

With reference now to FIGS. 12b and 12c, two different motive devices for rotating the pumping or mixing element 302 in the pipe 304 are disclosed. The first motive device includes a driving magnet assembly 320 that is rotatably supported on a bearing 322, such as a mechanical ball or roller bearing, carried on the outer surface of the pipe 304. The magnet assembly 320 includes a plurality of driving magnets 320a . . . 320n, also having different or alternating polarities. As with the driven magnets 308a . . . 308n, the driving magnets 320a . . . 320n are embedded or attached to an inert, non-magnetic matrix material M, such as plastic. An endless belt 324 also forming a part of the motive device frictionally engages both the driving magnet assembly 320 and a pulley W carried on the spindle or shaft of a motor (preferably a reversible, variable speed electric motor, as described above).

As should now be appreciated, the pumping or mixing element 302 is caused to levitate in the pipe 304 as a result of the interaction of the levitation magnets 305a, 305b with the adjacent superconducting elements 310a, 310b, which may be thermally separated from the outer surface of the pipe 304 (or the adjacent inner wall of the cryostat 310a, 310b, if present). Upon then rotating the magnetic drive assembly 320, the magnetic element 302 is caused to rotate in the pipe 304 serving as the vessel to provide the desiring pumping or mixing action. Even if the fluid F is flowing past the magnetic pumping or mixing element 302, it remains held in place in the desired position in the pipe 304 as a result of the pinning forces created by the superconducting elements 310a, 310b acting on the levitation magnets 305a, 305b.

The second version of a motive device is shown in the cross-sectional view of FIG. 12c, which is similar to the cross-section taken in FIG. 12b. However, instead of a magnetic driving assembly 320, endless belt 324, and motor, rotary motion is imparted to the pumping or mixing element 302 by creating an electrical field around the pipe 304. This may be done by placing a winding 326 around the outer wall of the pipe 304 and supplying it with an electrical current, such as from a power supply 328 or other source of AC current. Since the pumping or mixing element 302 carries magnets 308a . . . 308n having different polarities, the resulting electric field will thus cause it to rotate.

Figure 13:
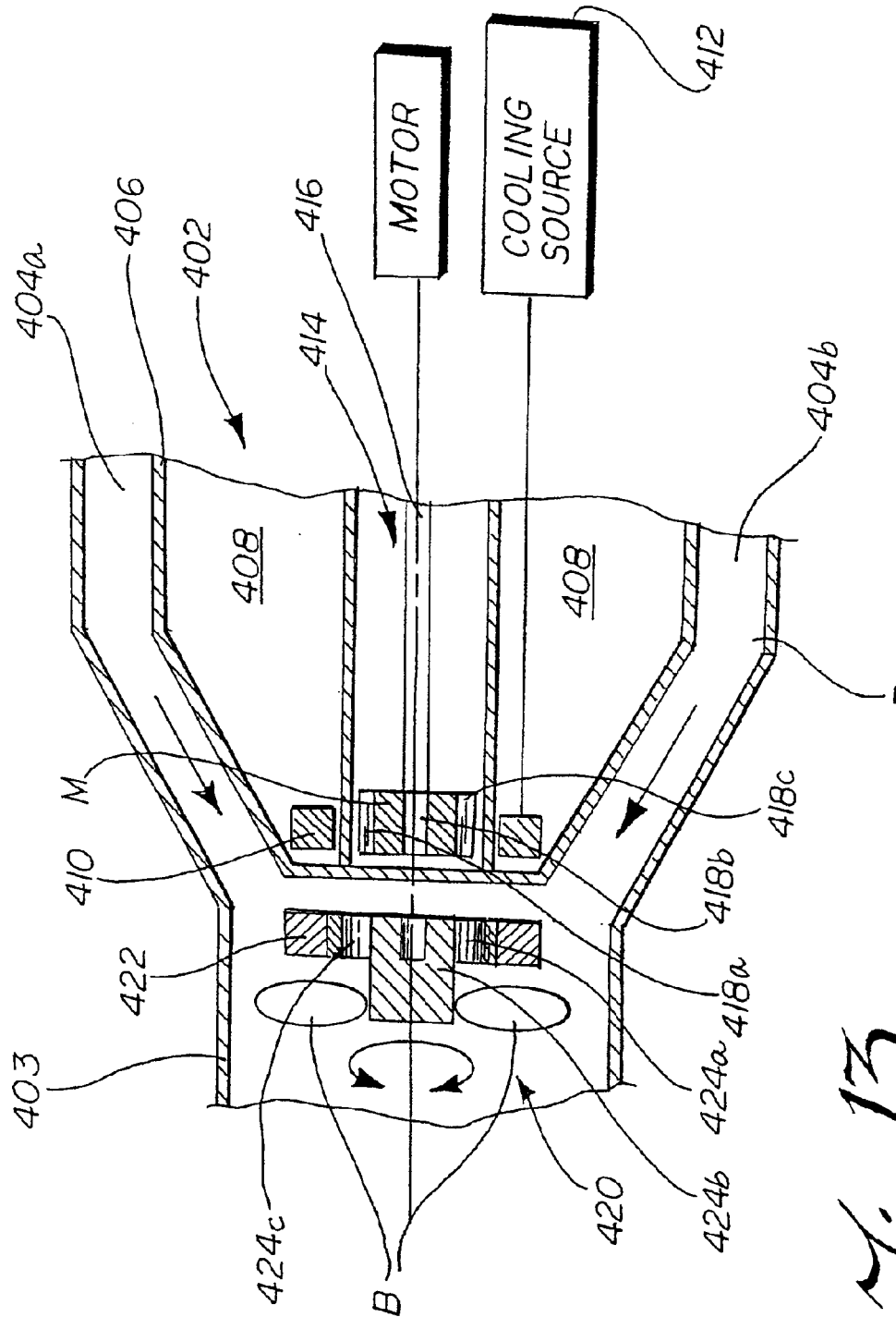
FIG. 13 is an alternate embodiment of an inline levitating magnetic element, similar in some respects to the embodiment of FIG. 9.

Yet another embodiment of an inline pumping or mixing system 400 is shown in FIG. 13. The cryostat 402 in this case is essentially positioned directly in the path of fluid flow along the pipe 403, thus creating an annular (or possibly upper and lower) flow channels 404a, 404b. The cryostat 402 has an outer wall 406 that defines a chamber 408 for containing a superconducting element 410. The superconducting element 410 may be annular in shape, in which case the chamber 408 is of a similar shape. The chamber 408 may also be evacuated or insulated to thermally separate the superconducting element 410 from the outer wall 406. The superconducting element 410 is thermally linked to a cooling source 412, as shown schematically in FIG. 13. It should be appreciated that this cryostat 402 is similar in many respects to the one described above in discussing the third embodiment illustrated in FIG. 9, which employs a similar, but somewhat reoriented, arrangement.

The wall 406 creating annular chamber 408 for the superconducting element 410 defines a room temperature bore or opening 414 into which a portion of a motive device may be inserted, such as the end of a shaft 416 carrying at least two driving magnets. FIG. 13 illustrates the motive device with three such driving magnets 418a, 418b, 418c, one of which is aligned with the rotational axis of the shaft 416. The opposite end of the shaft 416 is coupled to a motor (not numbered), which rotates the shaft and, hence, the driving magnets 418a, 418b, and 418c. The magnets 418a, 418b, 418c may be coupled directly to the shaft 416, or embedded/attached to an inert matrix material M.

The magnetic pumping or mixing element 420 is positioned in the pipe 403 adjacent to the outer wall 406 of the cryostat 402. The pumping or mixing element 420 includes a levitation magnet 422 that corresponds in size and shape to the superconducting element 410, as well as driven magnets 424a, 424b, 424c that correspond to the driving magnets 418a, 418b, and 418c. The levitation magnet 422 and driven magnets 424a–424c are attached to or embedded in a matrix material M, which may also support one or more blades B that provide the desired pumping or mixing action.

In operation, the motor rotates the shaft 416 to transmit rotary motion to the driving magnets 418a, 418b and 418c. As a result of the magnetic coupling formed between these magnets 418a–c and the opposite polarity driven magnets 424a–c, the pumping or mixing element 420 is caused to rotate in the fluid F. At the same time, the pumping or mixing element 420 remains magnetically suspended in the fluid F as the result of the pinning forces created between the superconducting element 410 and the levitation magnet 422. The operation is substantially the same as that described above with regard to the third embodiment, and thus will not be explained further here.

Figure 14:
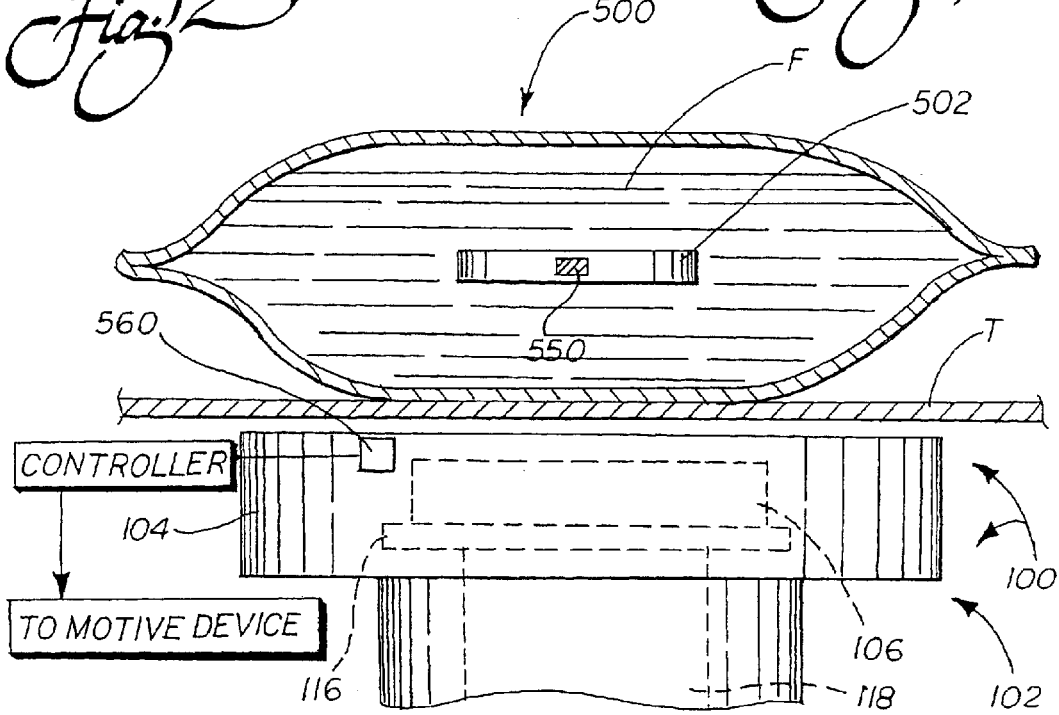
FIG. 14 is an enlarged partially cross-sectional, partially cutaway side view showing the manner in which a sealed flexible bag carrying a magnetic element may be used for mixing a fluid, and also showing one example of how a transmitter and receiver may be used to ensure that the proper magnetic element is used with the system.

Various optional modifications may in some circumstances enhance the set-up or performance of any of the systems described above, or instead adapt them for a particular use, purpose, or application. As noted previously, the disposable vessel or container for holding the fluid undergoing pumping or mixing may be in the form of a flexible bag. An example of such a bag 500 is shown in FIG. 14, along with the system 100 for levitating the pumping or mixing element 502 of FIG. 5. The bag 500 may be sealed with the fluid F and pumping or mixing element 502 (which may take the form of one of the several pumping or mixing elements disclosed above or an equivalent thereof) inside prior to distribution for use, or may be provided with a sealable (or resealable) opening that allows for the fluid and pumping or mixing element to be introduced (possibly pre-sterilized, and introduced along with a cell nutrient media, buffer, reagent, or the like, as discussed below) and later retrieved.

Both the pumping or mixing element 502 and bag 500, whether permanently sealed or resealable, may be fabricated of inexpensive, disposable materials, such as polymers (plastics). Accordingly, both can simply be discarded after the pumping or mixing operation is completed and the fluid F is retrieved. It should also be appreciated that the vertical dimension of the bag 500 is defined by the volume of fluid F held therein. Thus, instead of placing the bag 500 containing the pumping or mixing element 502 directly on the surface of the cryostat, table T, or other support structure adjacent to the superconducting element 106, it is possible to place the flexible bag 500 in a separate rigid or semi-rigid container (not shown). This helps to ensure that the fluid F provides the bag 500 with a sufficient vertical dimension to permit the magnetic element to freely rotate in a non-contact fashion. Alternatively, the mag 500 may include internal or external reinforcements (such as, for example, structural reinforcing ribs or the like, not shown) to enhance its rigidity without interfering with the rotation of the pumping or mixing element 502.

Figure 14A:
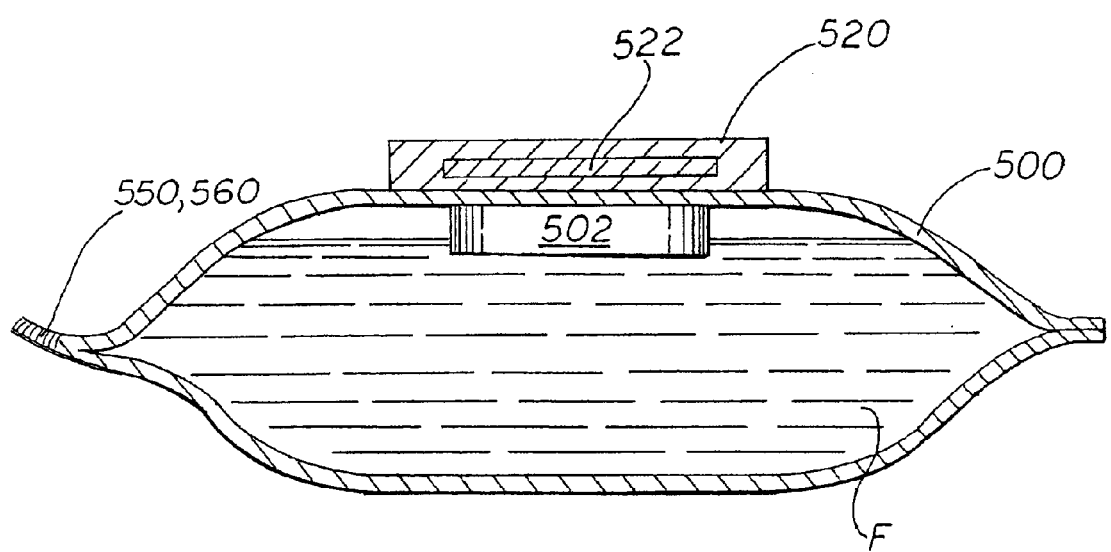
FIG. 14a is an enlarged, partially cross-sectional, partially cutaway side view showing an attachment including a coupler for coupling with the pumping or mixing element.
Figure 14B:
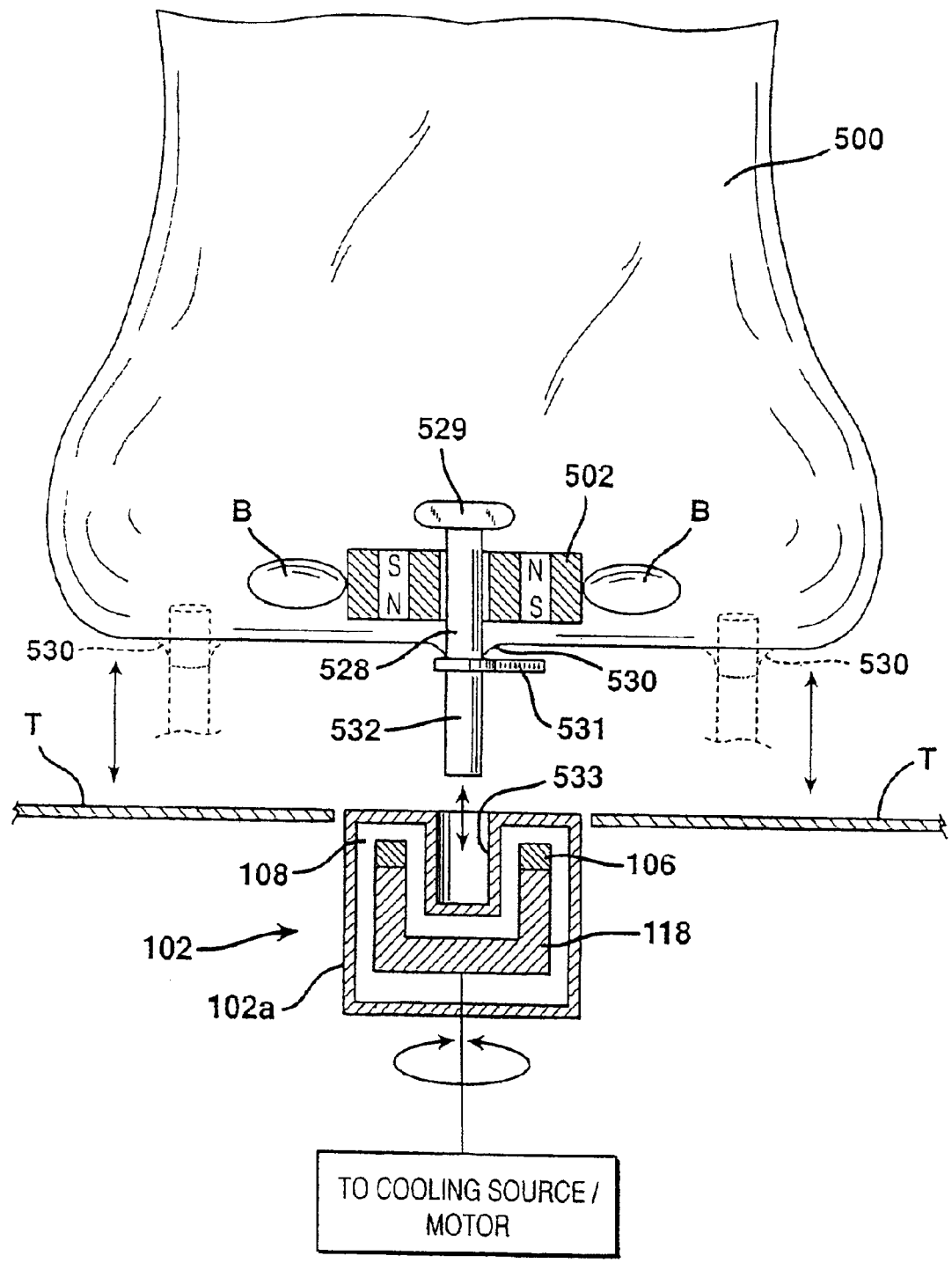
FIG. 14b is an enlarged, partially cross-sectional, partially cutaway side view showing a mixing vessel having a centering post.

In cases where the pumping or mixing element 502 is prepackaged in the bag 500, with or without fluid, it may inadvertently couple to adjacent magnets or other metallic structures. Breaking this coupling may render the bag susceptible to puncturing, tearing, or other forms of damage. Accordingly, as shown in FIGS. 14a and 14b, it may be desirable to hold the pumping or mixing element 502 place prior to use with any of the systems described herein, especially in cases where it is sealed inside the vessel/bag 500 during manufacturing As shown in FIG. 14a, one manner of holding the element 502 in place is to use an attachment 520, cover, or similar device including a coupler 522 formed of a ferromagnetic material or the like adjacent to the bag 500. This coupler 522 is thus attracted to and forms a magnetic coupling with the pumping or mixing element 502 when the attachment 520 is in place. As a result of this coupling, the pumping or mixing element 502 is prevented from coupling with magnets in adjacent bags or other magnetic structures (not shown). The attachment 520 should be fabricated of a nonmagnetic material, such as rubber. In the operative position, the coupler 522 shields the magnetic field created by the pumping or mixing element 502. When the assembly including the bag 500 and the pumping or mixing element 502 is ready for use, the attachment 520 may simply be removed from the bag 500 to break the magnetic coupling between the pumping or mixing element 502 and the coupler 522.

A second manner of keeping the pumping or mixing element 502 at a desired location to facilitate coupling with the particular levitation/rotation devices used is to provide the bag 500 with a "centering" structure, such as post 528. As shown in the embodiment illustrated in FIG. 14b, which includes the basic levitation and rotation system of FIG. 5, this post 528 may take the form of a rigid or semi-rigid piece of material projecting into the interior of the bag 500. Preferably, the post 528 is formed of the same material as the bag 500 or other container (plastic) and has an outer diameter that is less than the inner diameter or a bore or opening formed in the pumping or mixing element 502. As should be appreciated, the pumping or mixing element 502 may be held in place on the post 528 by gravity during shipping, prior to use, and even between uses. As illustrated, the upper end of the post 528 could also include a T-shaped or oversized head 529 (which could have a spherical, pyramidal, conic, or cubic shape). Alternatively, the head could have one or more transversely extending, deformable cross-members, an L-shaped hook-like member, or another type of projection for at least temporarily capturing the pumping or mixing element 502 to prevent it from inadvertently falling off when not in use. Of course, the positioning of the head 529 for capturing the pumping or mixing element 502 is preferably selected such that it does not interfere with the free levitation or rotation. As should be appreciated, the post 528 provides not only centering function, but also holds the pumping or mixing element 502 in place in case it accidentally decouples during the pumping or mixing operation. This significantly eases the process of returning the pumping or mixing element 502 to the proper position for initiating or resuming levitation/rotation by the corresponding system (which may be, for example, systems 10, 100, 200, 300, 800 etc.).

In FIG. 14b, this post 528 is adapted to receive the pumping or mixing element 502, which has a corresponding opening (and thus, may be annular or have any other desired shape or size). Since the post 528 preferably includes an oversized head portion 529 that keeps the pumping or mixing element 502 in place, including before a fluid is introduced, the vessel 500 may be manufactured, sealed (if desired), shipped, and stored prior to use with the pumping or mixing element 502 already in place. The vessel 500 may also be sterilized as necessary for a particular application, and in the case of a flexible bag, may even be folded for compact storage. As should be appreciated, the post 528 also serves the advantageous function of keeping the pumping or mixing element 502 substantially in place (or "centered") should it accidentally become decoupled from the adjacent motive device, which as in this case is a rotating annular superconducting element 106. However, the centering post 528 could also be used in the embodiment of FIG. 9 as well by simply forming a center opening in the pumping or mixing element 204.

In the illustrated embodiment, the post 528 is shown as being formed by an elongated rod-like structure inserted through one of the nipples 530 typically found in the flexible plastic bags frequently used in the bioprocessing industry (pharmaceuticals, food products, cell cultures, etc.). The oversized head portion 529 is preferably formed of a material that is sufficiently flexible/deformable to easily pass through the opening in the nipple 530. A conventional clamp 531, such as a cable or wire tie, may be used to form a fluid-impervious seal between the nipple 530 and the portion of the post 528 passing therethrough, but other known methods for forming a permanent or semi-permanent seal could be used (e.g., ultrasonic welding in the case of plastic materials, adhesives, etc.). Any other nipples 530 present (shown in phantom in FIG. 14b) may be used for introducing the fluid prior to mixing, retrieving a fluid during mixing or after mixing is complete, or circulating the fluid in the case of a pumping operation. Advantageously, the use of the rod/nipple combination allows for easy retrofitting. Nevertheless, instead of using a separate rod, the post 528 may be integrally formed with the material forming the vessel 500, either during the manufacturing process or as part of a retrofit operation. The oversized head portion 529 may be cross-shaped, disc-shaped, L-shaped, Y-shaped, or may have any other desired shape, as long as the corresponding function of capturing the pumping or mixing element 502 is provided. The head portion 529 may be integrally formed, or alternatively may be provided as a separate component that is clamped or fastened to the post 528.

In yet another embodiment, the vessel 500 may also include a structure that helps to ensure that proper alignment is achieved between the centering post 528 and an adjacent structure, such as a device for rotating and/or levitating the pumping or mixing element 502. In the embodiment of FIG. 14b, this alignment structure is shown in the form of an alignment post 532 projecting outwardly from the vessel 500 and co-extensive with the centering post 528. The adjacent motive device, which as shown as including a cryostat 102 containing a rotating superconducting element 106, includes a locator bore 533. This bore 533 is concentric with the superconducting element 106 and is sized and shaped for receiving the alignment post 532 (which may have any desired cross-sectional shape, including circular, elliptical, square, polygonal, etc.). As a result of the centering and alignment posts 528, 532, assurance is thus provided that the pumping or mixing element 502 is in the desired position for forming a coupling with an adjacent motive device, such as the cryostat 102 housing the rotating superconducting element 106 (which may both rotate together, as described above). This is particularly helpful for properly aligning the pumping or mixing element 502 with the cryostat, such as cryostat 102, in the case of opaque vessels or adjacent containers, sealed or aseptic containers, large containers, or where the fluid is not clear. Instead of forming the alignment post 532 from an elongated rod inserted into a nipple 530 or the like, it should be appreciated that it may also be integrally formed with the vessel 500 during manufacturing, or later during a retrofit. FIG. 14b also shows the centering post 528 projecting upwardly from a bottom wall of the vessel 500, but as should be appreciated, it could extend from any wall or other portion thereof. For example, the rod serving as both the centering post 528 and the alignment post 532 may be positioned substantially perpendicular to a vertical plane.

In many of the above-described embodiments, the pumping or mixing action is essentially localized in nature. This may be undesirable in some situations, such as where the vessel or volume of fluid is relatively large compared to the pumping or mixing element. To solve this problem, the particular system used to supply the pumping or mixing action may be provided with a motive device for physically moving the superconducting element (which may also be simultaneously rotated), which will cause the levitating magnetic pumping or mixing element to follow a similar path.

Figure 14C:
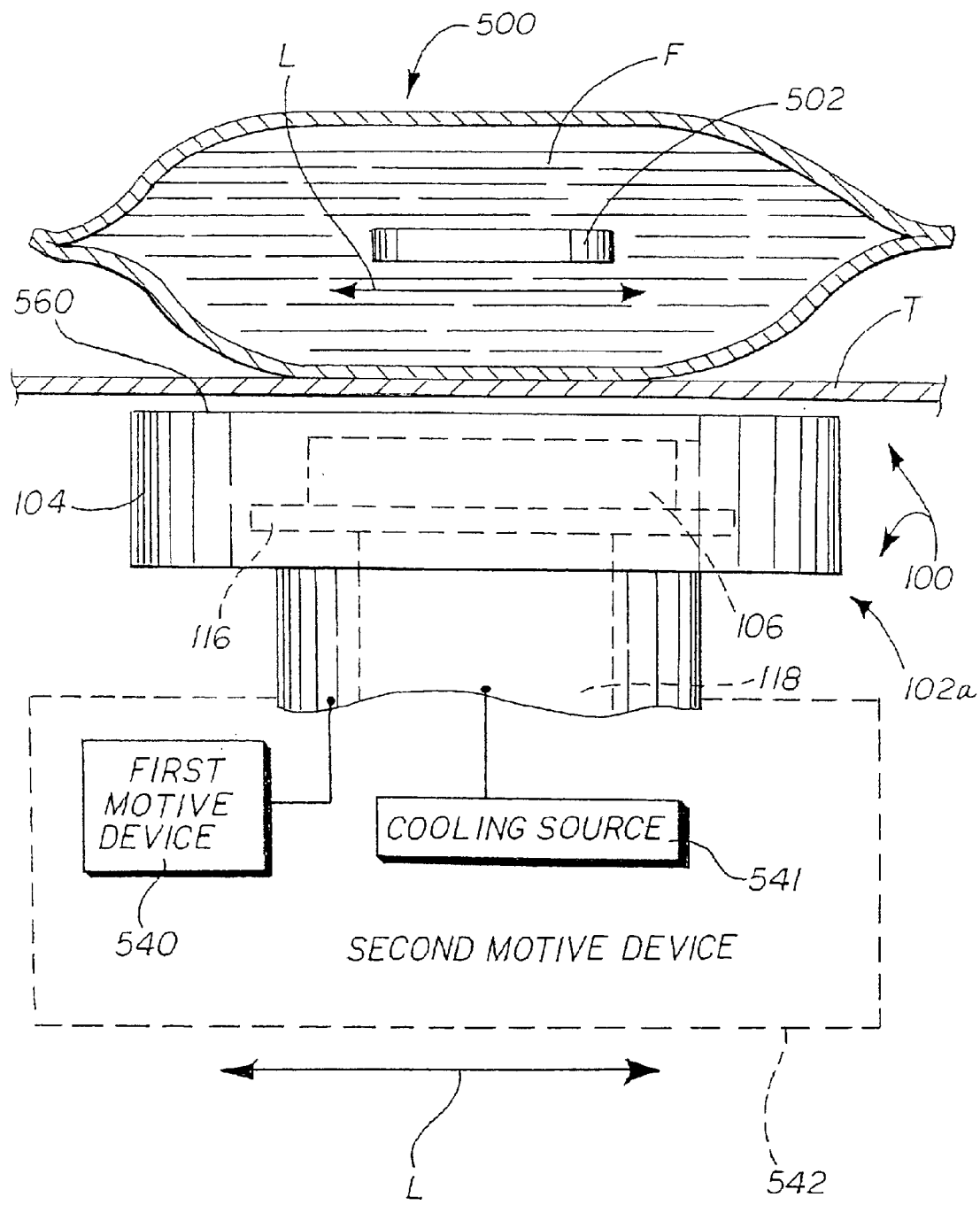
FIG. 14c is an enlarged, partially cross-sectional, partially cutaway side view showing the use of a second motive device in the system of FIG. 14, such as a linear motion device, for moving the superconducting element, and hence, the pumping or mixing element to and fro inside of the vessel.

With reference to the schematic view of FIG. 14c, and by way of example only, the particular arrangement is shown in use on the system 100 of FIG. 5, but with the bag 500 of FIG. 14. In addition to a motive device 540 for rotating the first portion of the cryostat 102a (which may comprise the bearing(s) 120, endless belt 128, motor 131, shaft, and pulley) and a cooling source 541, the system 100 may include a second motive device 542. In one embodiment, this second motive device 542 (shown schematically in dashed line outline only in FIG. 14b) is capable of moving the first portion of the cryostat 102a, and hence the superconducting element 106, to and fro in a linear fashion (see action arrows L in FIG. 14c). Thus, in addition to levitating and rotating the pumping or mixing element 502, the side-to-side motion allows it to move relative to the bag 500 or other vessel containing the fluid. This advantageously permits non-localized pumping or mixing action to be provided. The motive device 542 may include a support structure, such as a platform (not shown) for supporting all necessary components, such as the first portion of the cryostat 102a (or the entire cryostat, such as in the embodiment of FIG. 9), the first motive device 540 for rotating one of the superconducting element 106 (or the magnetic pumping or mixing element 502 such as in the embodiment of FIG. 9), and the cooling source 541 (which may form part of the cryostat as shown in FIG. 9, or may be a separate component altogether, as shown in FIG. 2). Instead of using a linear motion device, it should also be appreciated that the second motive device 542 may be capable of moving the superconducting element in a circular or elliptical pattern relative to the fixed position of the bag 500 or other vessel, or in any other direction that will enhance the overall mixing or pumping action provided by the rotating pumping or mixing element 502. Also, the bag 502 or vessel may be separately rotated or moved to further enhance the operation (see the above-description of the embodiment of FIG. 3).

Ensuring that the magnetic pumping or mixing element is proper for a particular system and are sized properly may also be important. To do so, it is possible to provide a transmitter in one of the magnetic element or the vessel for generating a signal that is received by a receiver in the system (or vice versa), such as one positioned adjacent to the superconducting element or elsewhere. An example of one possible configuration is shown in FIG. 14, wherein the transmitter 550 is provided on the pumping or mixing element 502 itself and the receiver 560 is positioned in the cryostat 102 (but see FIG. 14a, wherein the transmitter 550 or receiver 560 is provided in the bag serving as the vessel). A controller for the system, such as a computer (not shown) or other logic device, can then be used to maintain the system for rotating the pumping or mixing element 502 in a non-operational, or "lock-out," condition until the receiver and transmitter 550, 560 correspond to each other (that is, until the transmitter 550 generates an appropriate signal that is received by the receiver 560). The transmitter/receiver combination employed may be of any type well known in the art, including electromagnetic, ultrasound, optical, or any other wireless or remote signal transmitting and receiving devices.

In accordance with another aspect of the invention, a kit is also provided to assist in the set-up of any of the systems previously described. Specifically, and as briefly noted in both this and my prior pending application, it is necessary during field cooling to cool the superconducting element to below its transition temperature in the presence of a magnetic field in order to induce levitation in a permanent magnet producing the same magnetic field. This cooling process causes the superconducting element to "remember" the field, and thus induce the desired levitation in the pumping or mixing element each time it or an additional magnet is placed over the superconducting element. While it is possible to use the magnetic pumping or mixing element itself to produce the magnetic field during field cooling, oftentimes the pumping or mixing element will be sealed in the vessel or container. This makes it difficult, if not impossible, to ensure that the corresponding magnets are properly aligned and spaced from the superconducting element during cooling.

Figure 15:
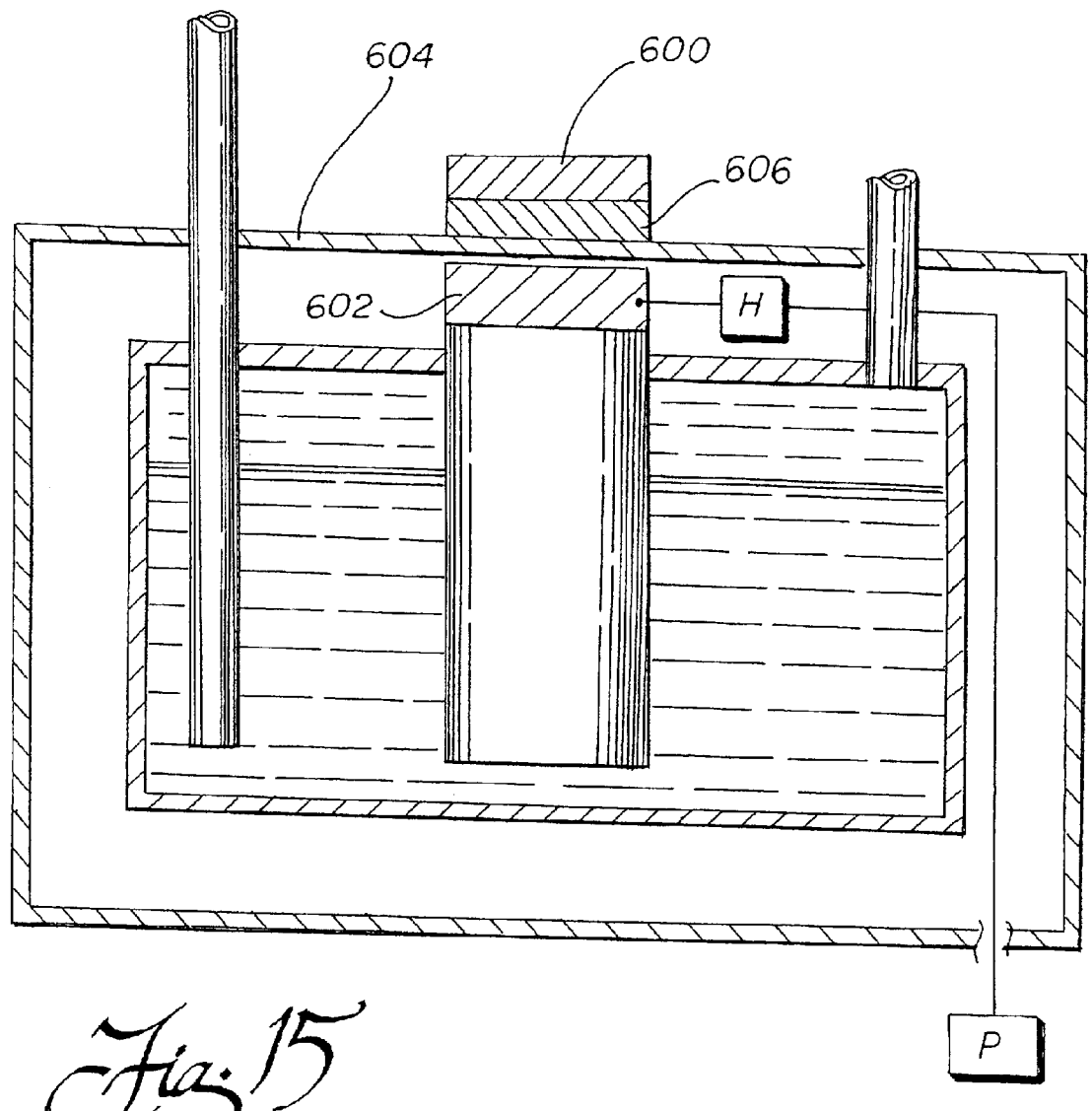
FIG. 15 illustrates one charging magnet including a spacer that may form part of a kit for use in charging the superconducting element as it is cooled to the transition temperature, as well as a heater for warming the superconducting element to above the transition temperature for recharging.

To overcome this potential problem, the set-up kit of the present invention as illustrated in FIG. 15 comprises a charging magnet 600 having a size, shape, and magnetic field distribution that is identical to the levitation magnet contained in the particular pumping or mixing element slated for use in one of the pumping or mixing systems previously described. The charging magnet 600 is placed adjacent to the superconducting element 602, such as on the upper surface of the cryostat 604, table (not shown), or other chamber. As illustrated, the charging magnet 600 may further include a spacer 606. This spacer 606 allows the charging magnet 600 to simulate the spacing of the magnetic pumping or mixing element (not shown) above the superconducting element 602 during field cooling. This ensures that the desired levitation height is achieved for the magnetic element (not shown) once the vessel is in position. The spacer 606 is formed of a non-magnetic material to avoid interfering with the charging process. By providing a variety of different sizes, shapes, and configurations of charging magnets in the kit (e.g., annular magnets), it is possible to easily perform field cooling for any corresponding size or shape of levitation magnet in the corresponding magnetic pumping or mixing element, and then simply place the vessel containing the magnetic element over the superconducting element 602 to induce the desired stable, reliable levitation.

During field cooling, and regardless of whether the magnetic pumping or mixing element or a separate charging magnet 600 is used to produce the charging magnetic field, it is possible to induce an undesired magnetic state in the superconducting element 602, such as if the position of the pumping or mixing element (not shown) or charging magnet 600 is not correct. Since improper charging may prevent the magnetic pumping or mixing element from levitating in a stable fashion, recharging the superconducting element 602 may be required. To facilitate recharging the superconducting element, it is provided with a heater H, such as an electric heating coil (not shown). By energizing this coil using a power supply P or other source of electrical current (not shown), the superconducting element 602 may be quickly brought up from the transition temperature for recharging. As shown schematically, the power supply P is preferably positioned externally to the cryostat 604. Once the position of the magnetic element or charging magnet 600 is adjusted or corrected, the heater H may be turned off and the superconducting element once again allowed to cool to the transition temperature in the presence of the desired magnetic field.

Figure 16:
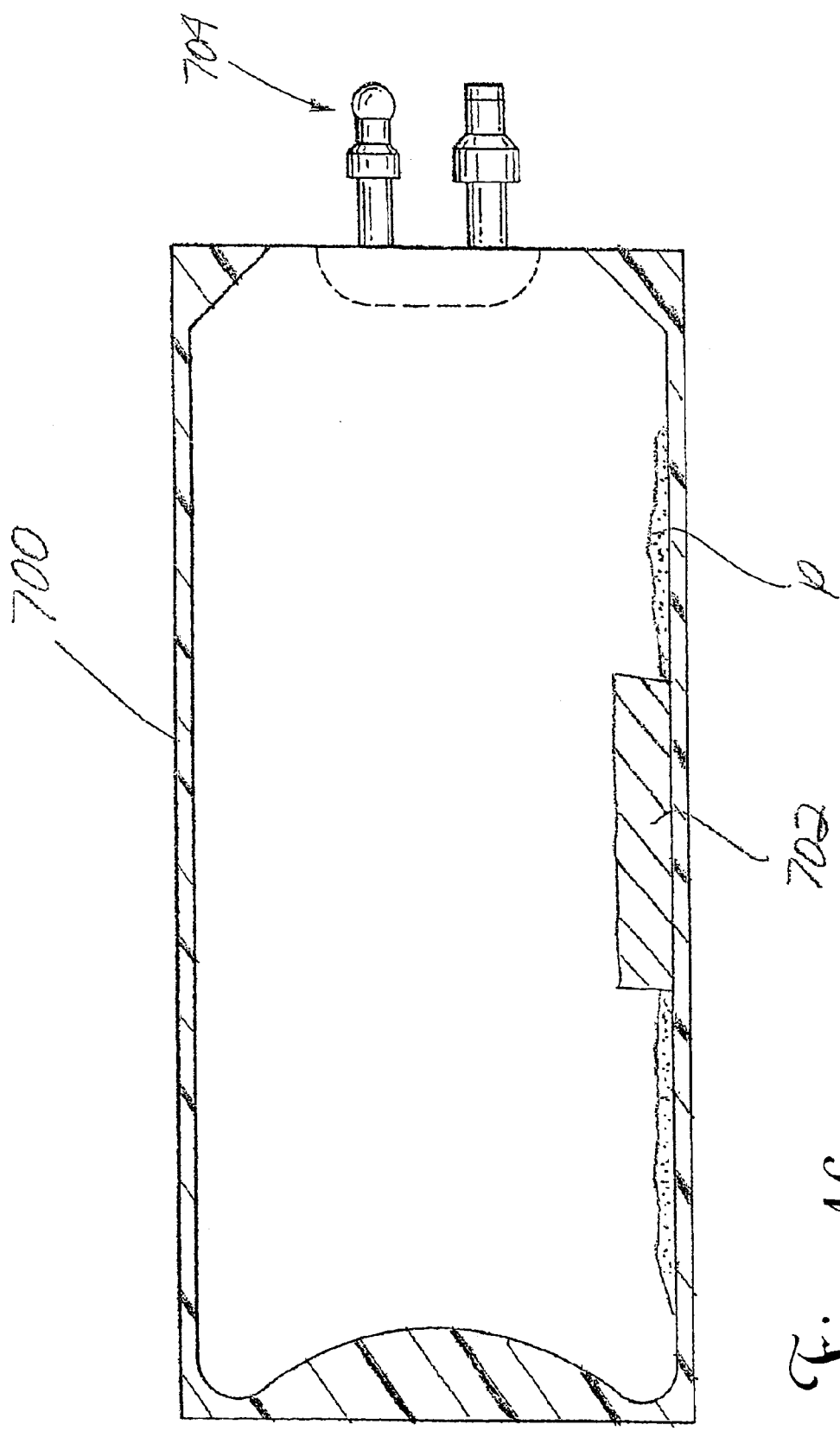
FIG. 16 illustrates a cross-sectional side view of one possible embodiment in which a sterile or aseptic vessel or container is pre-sealed with a sterilized magnetic element and other product inside.

Reference is now made to FIG. 16, which illustrates in a partially cross-sectional side view an embodiment where a container or vessel 700 is sealed having at least a magnetic element 702, rotor, impeller or the like contained therein. The vessel or container 700 may be rigid or semi-rigid or may be flexible. If flexible, a rigid pallet, as disclosed for example in U.S. Pat. No. 6,076,457, to Vallot (which is incorporated herein by reference) may also be employed to provide support for the container, such as during transportation. The container or vessel 700 may have no defined inlet or outlets, or may have any desired number of inlets or outlets of any type known in the art, such as for introducing fluids, recovering fluids during pumping or after mixing is complete, or relieving pressure from the container (e.g., gas), either as a result of biological activity or at the time of introducing a fluid. One example of a suitable container is the "sachet," as disclosed in the art (U.S. Pat. Nos. 6,186, 932, 5,988,422, and 5,350,080, the disclosures of which are incorporated herein by reference). Preferably, the vessel or container 700 has a volume of greater than 10 liters (in which conventional magnetic stirrer bar arrangements are generally incapable of providing adequate pumping or mixing action without the risk of decoupling, generating high shear stresses, or unwanted frictional heating with the sidewalls), but can be in the form of a tank capable of holding several hundred or thousand liters of fluid.

To create a sterile pumping or mixing environment, which is desirable for many applications (such as the manufacture or processing of biologically active materials (blood, insulin, etc.), pharmaceuticals, intermediates thereof, or the like), it is possible to sterilize and seal the container or vessel 700 with a sterilized pumping or mixing element 702 contained therein for use as a self-contained unit. In addition to the pumping or mixing element 702, an optional product P, such as a bacterial nutrient culture media, eukaryotic cell nutrient culture media, buffer, reagent, or the like (hereinafter referred to generically as a "product") may be introduced into the container or vessel 700 prior to sealing it (as is shown in FIG. 16). The product P is typically in the form of a dry powder, but other forms, such as a gel, tablet, fluid suspension/mixture, or the like could also be used. Of course, one latent advantage of providing a pre-sealed, aseptic container or vessel 700 with only the product P and a pumping or mixing element 702 is the significant reduction in the trouble and expense associated with transporting fluid-filled containers or vessels to a location where the pumping or mixing will occur (either during later shipping to a final destination or along an assembly line).

In the case of a dry powder, fluid (which could be sterile water, a buffer (to maintain a certain specified pH or a desired osmolality, etc.), reagent, or the like) may be introduced after sealing, but prior to mixing or pumping. As briefly mentioned above, a fitting 704 (which may be any well-known type of sterile or aseptic fitting, swage lock, septum (see, e.g., U.S. Pat. No. 6,090,091 and the other patents cited therein, the disclosures of which are incorporated herein by reference), or the like formed of any type of material (preferably disposable, but possibly also non-disposable)) may be provided to allow for the introduction and/or removal of the fluid (and possibly for the simultaneous introduction and removal of fluid as is required during pumping). Various types of such fittings are well-known in the art, as demonstrated in the '932, '422, and '091 patents cited above, as well as in U.S. Pat. No. 5,350,080, the disclosure of which is also incorporated herein by reference. A vessel 700 with such a fitting 704 is still referred to as "sealed" herein, since it is sealed in the sense that contaminants are kept out. However, it should also be appreciated that a sealed container or vessel 700 could be one without a defined inlet or outlet (e.g., a hermetically sealed bag, box, or the like). Also, as is known in the art, special filters may be used to ensure the sterility of any fluid introduced into the vessel or container 700, as well as special hoods or clean rooms designed to maintain sterile conditions.

While the use of conventional durable, lightweight polymeric materials (polypropylene, polyethylene, etc.) for forming the container or vessel 700 is possible, materials having special properties, such as a resistance to ultraviolet light or other types of undesirable energy that may damage sensitive products P, or multi-layered materials may also be used. Examples of specialized multi-layered materials for forming flexible or semi-rigid disposable media containers or vessels are disclosed in U.S. Pat. Nos. 6,168,862, 5,998, 019, and the various references cited therein, the disclosures of all of which are incorporated herein by reference.

As should be appreciated, many of the pumping or mixing systems disclosed herein, and especially systems 100, 200, and 300, are well-adapted for use with vessels or containers 700 having a product P, such as a bacterial cell or eukaryotic nutrient media, and pumping or mixing element 702 in the form of a magnetic rotor or impeller pre-sealed therein to maintain a sterile environment, both before and after pumping or mixing is completed. More specifically, after field charging is complete and any external attachment is removed (see FIG. 14a), the sealed container or vessel 700 including the magnetic element 702 is simply brought into the presence of the superconducting element, as is described above and shown in FIG. 14. This causes the pumping or mixing element 702 to levitate in a stable fashion, while the cold superconducting element remains completely thermally separated/thermally isolated from the vessel or container 700 since it is positioned in an evacuated or insulated space. If not already present, the fluid F may be introduced into the vessel or container 700, such as through any fitting 704 present either before or after levitation in the pumping or mixing element 702 is induced. By then rotating the pumping or mixing element 702 using any of the drive arrangements described herein, it is possible to gently mix the fluid in a sterile or aseptic environment (and possibly pump the fluid F, in the event that the container 700 is provided with a suitable inlet and outlet (not shown, but see FIGS. 2, 7, and 11)). Aside from introducing the fluid, if necessary, no additional external contact or intervention is required, which advantageously allows for the sterile or aseptic environment to be maintained. This advantageously also eliminates the need for introducing a magnetic stirrer bar through a resealable opening in the vessel or a shaft carrying a mixing blade or the like through the vessel or container wall (or a dynamic seal or bearing provided therein), both of which not only increase the effort required to complete the pumping or mixing operation, but also the potential for deleterious contamination.

Once mixing is complete, the end product (the fluid F containing any media, buffer, reagent, or the like) may then be retrieved or recovered through the fitting 704 in any known manner (preferably one that maintains sterility) and for any known use. In the case where the container or vessel 700 is disposable, it may then simply be discarded with the pumping or mixing element 702 inside, which advantageously avoids the need for clean-up or resterilization.

Other systems for levitating pumping or mixing elements are disclosed in commonly owned pending U.S. patent application Ser. No. 09/724,815 and PCT application Ser. No. PCT/US01/31459 (designating the United States), the disclosures of which are both incorporated herein by reference.

In summary, a number of systems 10, 100, 200, 300, as well as variations on these systems and related methods, are disclosed that use or facilitate the use of superconducting technology to levitate a magnetic element that, when rotated, serves to pump or mix a fluid. In one system 10, the magnetic pumping or mixing element 14 is placed in a fluid vessel 16 positioned external to a cryostat 12 having an outer wall or other housing 18 for containing a superconducting element 20. A cooling source 24 (either a cryogenic chamber 26, FIGS. 1 and 3 or a refrigerator 48, FIG. 2) thermally linked to the superconducting element 20 provides the necessary cooling to create the desired superconductive effects and induce levitation in the magnetic element 14. Since the magnetic element levitates in the fluid F, no penetration of the vessel walls by mixing or stirring rods is necessary, which eliminates the need for dynamic bearings or seals.

Additionally, the outer wall 18 of the cryostat 12 or other housing defines a chamber 25 that thermally isolates and separates the superconducting element 20 from the vessel 16 containing the fluid F and magnetic element 14. The thermal isolation may be provided by evacuating the chamber 25, or filling it with an insulating material. By virtue of this thermal isolation and separation, the superconducting element 20 can be positioned in close proximity to the outer wall or housing 18 adjacent to the vessel 16 and magnetic element 14, thereby achieving a significant reduction in the separation distance or gap G between the magnetic element 14 and the superconducting element 20. This enhances the magnetic stiffness and loading capacity of the magnetic levitating element 14, thus making it suitable for use with viscous fluids or relatively large volumes of fluid.

The exceptionally stable levitation provided as a result of the reduced separation distance also significantly reduces the potential for contact between the rotating magnetic element and the bottom or sidewalls of the vessel. This makes this arrangement particularly well-suited for use in fluids that are sensitive to shear stress or the effects of frictional heating. However, since the superconducting element 20 is substantially thermally isolated and separated from the vessel 16, the magnetic element 14, and hence the fluid F contained therein, may be shielded from the cold temperatures generated by the cooling source 24 to produce the desired superconductive effects and the resultant levitation. This allows for temperature sensitive fluids to be mixed or pumped. By using means external to the vessel 16 to rotate and/or stabilize the magnetic element 14 levitating in the fluid F, such as one or more rotating driving magnets coupled to the magnetic element 14, the desired pumping or mixing action is provided.

Additional embodiments of systems 100, 200 for pumping or mixing a fluid wherein the necessary motive force is provided from the same side of the vessel at which the superconducting element is positioned are also disclosed, as are systems 300, 400 for rotating an inline magnetic element positioned in a vessel in the form of a pipe or the like. Also, the concept of sealing a pumping or mixing element 702 in a container or vessel 700, such as a flexible bag capable of holding a volume of fluid greater than ten liters, along with a product P to create and maintain a sterile or aseptic environment during the pumping or mixing operation is also disclosed.

The foregoing description of various embodiments of the present invention have been presented for purposes of illustration and description. The description is not intended to be exhaustive or to limit the invention to the precise forms disclosed. Obvious modifications or variations are possible in light of the above teachings. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A fluid pumping or mixing system, comprising:

a vessel or container for holding a fluid and a product;

a magnetic element capable of providing a pumping or mixing action to the fluid upon rotation;

at least one superconducting element for levitating said magnetic element in the vessel or container;

a wall defining a chamber around the superconducting element, said chamber thermally isolating the superconducting element from the vessel or container;

a cooling source thermally linked to said superconducting element;

a motive device for rotating said superconducting element.

2. The system for pumping or mixing a fluid according to claim 1, wherein the chamber is evacuated or insulated to minimize thermal transfer from said superconducting element to said wall and provide the desired thermal isolation.

3. The system for pumping or mixing a fluid according to claim 1, wherein said wall is the outer wall of a cryostat and said cooling source is a chamber in said cryostat holding a liquid cryogen.

4. The system for pumping or mixing a fluid according to claim 1, wherein said cooling source is a refrigerator.

5. The system for pumping or mixing a fluid according to claim 1, wherein said superconducting element is supported by the wall defining said chamber, and wherein said chamber is in turn supported from a stable mounting structure by a bearing permitting rotational motion, said motive device rotating said wall and said superconducting element together.

6. The system for pumping or mixing a fluid according to claim 5, wherein said cooling source is coupled to and rotates with said wall.

7. The system according to claim 1, wherein the product is selected from the group consisting of a bacterial nutrient culture media, eukaryotic cell nutrient culture media, buffer, reagent, and the like.

8. The system according to claim 1, wherein the product is introduced into the vessel in a dry, powder-like form and the fluid is introduced either before or after the magnetic element is in a levitated state.

9. The system according to claim 1, wherein the vessel is substantially sealed prior to the levitation of the magnetic element, but includes a sterile fitting for introducing or extracting the fluid, product, or both therefrom.

10. The system according to claim 1, wherein the vessel and magnetic element are sterilized prior to introduction of the fluid.

11. The system for pumping or mixing a fluid according to claim 1, wherein the vessel is capable of holding a volume of fluid of about 10 liters or greater.

12. A method of mixing a fluid in a vessel or container, comprising:

placing a magnetic pumping or mixing element and a product in the vessel or container;

substantially sealing the vessel or container from the outside environment;

levitating the magnetic element above a superconducting element positioned in an evacuated or insulated chamber adjacent to the vessel or container and thermally linked to a cooling source; and rotating the superconducting element.

13. The method according to claim 12, further including cleaning or sterilizing both the vessel or container and the magnetic element prior to the sealing step.

14. The method according to claim 12, further including placing the product in the vessel prior to the sealing step.

15. The method according to claim 12, wherein the substantially sealed vessel includes at least one sterile or aseptic fitting, and further including the step of introducing the fluid into the vessel after the sealing step through the fitting, whereby a sterile or aseptic mixing environment is created.

* * * * *